(12) United States Patent
Parker et al.

(10) Patent No.: US 9,513,428 B2
(45) Date of Patent: *Dec. 6, 2016

(54) LIGHTING ASSEMBLY

(71) Applicant: Rambus Delaware LLC, Brecksville, OH (US)

(72) Inventors: Jeffery R Parker, Pleasanton, CA (US); Timothy A McCollum, Avon Lake, OH (US); Matthew R Wancata, Strongsville, OH (US); Fumitomo Hide, San Jose, CA (US); Alexey Titov, Portage, MI (US); Ian Hardcastle, Santa Cruz, CA (US)

(73) Assignee: Rambus Delaware LLC, Brecksville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,001

(22) Filed: Jul. 22, 2015

(65) Prior Publication Data

US 2016/0018588 A1 Jan. 21, 2016

Related U.S. Application Data

(63) Continuation of application No. 14/326,141, filed on Jul. 8, 2014, now Pat. No. 9,116,274, which is a
(Continued)

(51) Int. Cl.
*F21V 7/04* (2006.01)
*F21V 8/00* (2006.01)
(Continued)

(52) U.S. Cl.
CPC ............. *G02B 6/0086* (2013.01); *F21S 2/005* (2013.01); *F21S 8/066* (2013.01); *F21V 17/18* (2013.01);
(Continued)

(58) Field of Classification Search
CPC ........................... F21Y 2101/002; F21S 2/005
(Continued)

(56) References Cited

U.S. PATENT DOCUMENTS 8,770,816 B2   7/2014  Parker et al.
9,116,274 B2   8/2015  Parker et al.
(Continued)

FOREIGN PATENT DOCUMENTS

| JP | 08138428 | 5/1996 |
|----|----------|--------|
| JP | 11260568 | 9/1999 |
| JP | 2004265797 | 9/2004 |

OTHER PUBLICATIONS

PCT/US2012/032405; International Search Report and Written Opinion of the International Searching Authority mailed Oct. 19, 2012. 11 pages.
(Continued)

*Primary Examiner* — Vip Patel
(74) *Attorney, Agent, or Firm* — Renner, Otto, Boisselle & Sklar, LLP

(57) ABSTRACT

A lighting assembly includes a light engine and a light guide. The light engine edge lights the light guide and includes a control assembly that controls light output according to one or more parameters to produce light output from the lighting assembly with a desired characteristic. Lighting assemblies are combined to form a modular lighting assembly.

20 Claims, 16 Drawing Sheets

Related U.S. Application Data continuation of application No. 13/440,210, filed on Apr. 5, 2012, now Pat. No. 8,770,816.

(60) Provisional application No. 61/486,096, filed on May 13, 2011.

(51) Int. Cl.
*F21S 2/00* (2016.01)
*F21S 8/06* (2006.01)
*F21V 21/30* (2006.01)
*F21V 17/18* (2006.01)
*F21V 21/34* (2006.01)
*F21V 17/00* (2006.01)
*F21V 21/35* (2006.01)
*F21Y 105/00* (2016.01)
*F21Y 101/00* (2016.01)

(52) U.S. Cl.
CPC .............. *F21V 21/30* (2013.01); *F21V 21/34* (2013.01); *G02B 6/004* (2013.01); *G02B 6/0075* (2013.01); *G02B 6/0085* (2013.01); *F21V 17/007* (2013.01); *F21V 21/35* (2013.01); *F21Y 2101/00* (2013.01); *F21Y 2103/10* (2016.08); *F21Y 2105/00* (2013.01); *F21Y 2113/13* (2016.08); *F21Y 2115/10* (2016.08); *F21Y 2115/15* (2016.08); *F21Y 2115/30* (2016.08); *G02B 6/0033* (2013.01); *G02B 6/0076* (2013.01)

(58) Field of Classification Search
USPC ................................ 362/609, 608, 611, 613
See application file for complete search history.

(56) References Cited

U.S. PATENT DOCUMENTS

2009/0109440 A1  4/2009  Wu et al.
2013/0163283 A1  6/2013  Tanaka et al.

OTHER PUBLICATIONS

PCT/US2012/032405; International Preliminary Report on Patentability mailed Nov. 19, 2013. 8 pages.

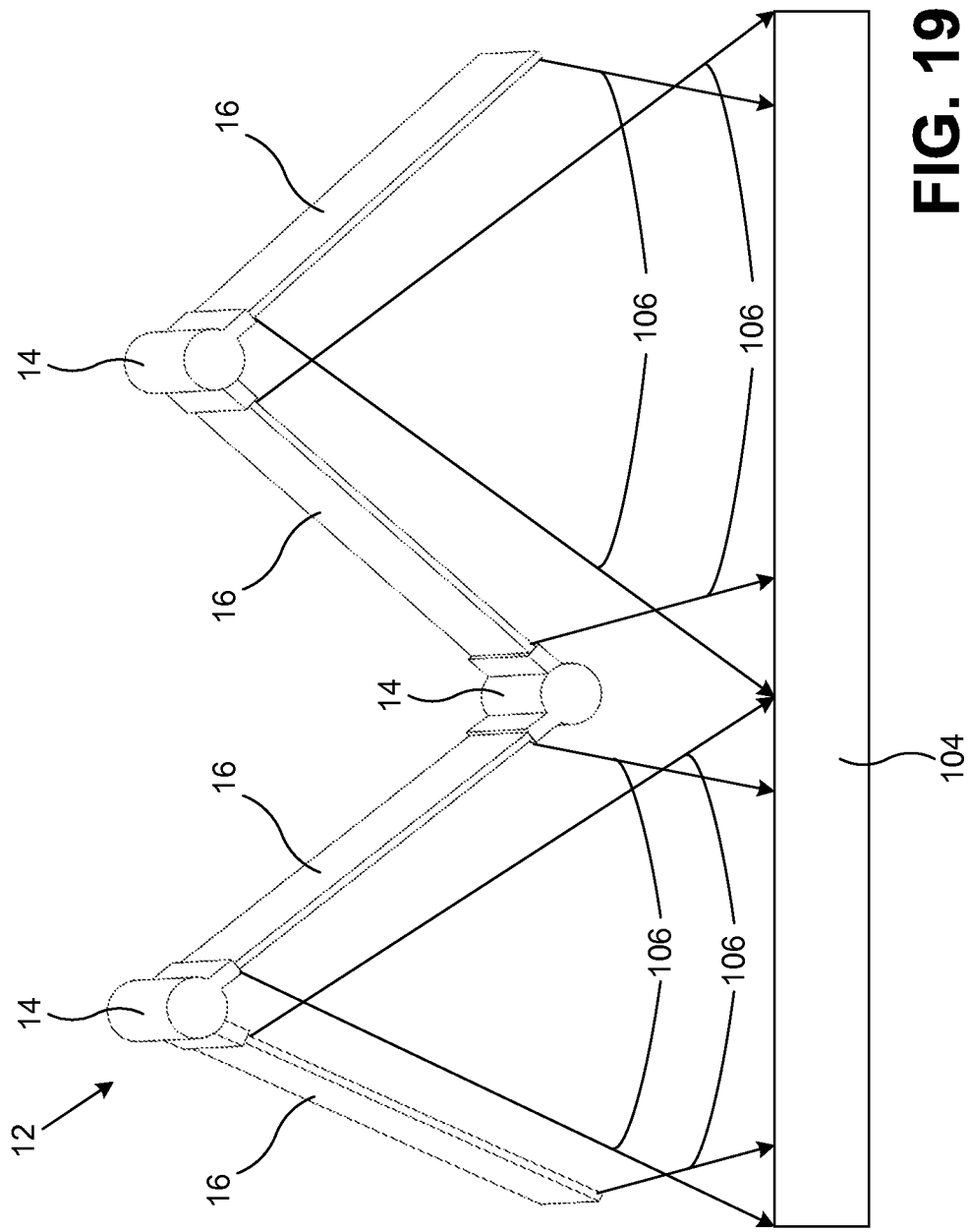

LIGHTING ASSEMBLY

RELATED APPLICATION DATA

This application is a continuation of U.S. patent application Ser. No. 14/326,141, filed Jul. 8, 2014, which is a continuation of U.S. patent application Ser. No. 13/440,210, filed Apr. 5, 2012, which claims the benefit of U.S. Provisional Patent Application No. 61/486,096, filed May 13, 2011, the disclosures of which are incorporated herein by reference in their entireties.

BACKGROUND

Energy efficiency has become an area of interest for energy consuming devices. One class of energy consuming devices is lighting devices. Solid-state light sources, such as light emitting diodes (LEDs), show promise as energy efficient light sources for lighting devices. But there remains room for new and interesting ways of configuring lighting assemblies that use solid-state light sources.

BRIEF DESCRIPTION OF THE DRAWINGS

FIG. 19 is a schematic view of another exemplary modular lighting assembly configured to illuminate a surface;

DETAILED DESCRIPTION

Figure 1:
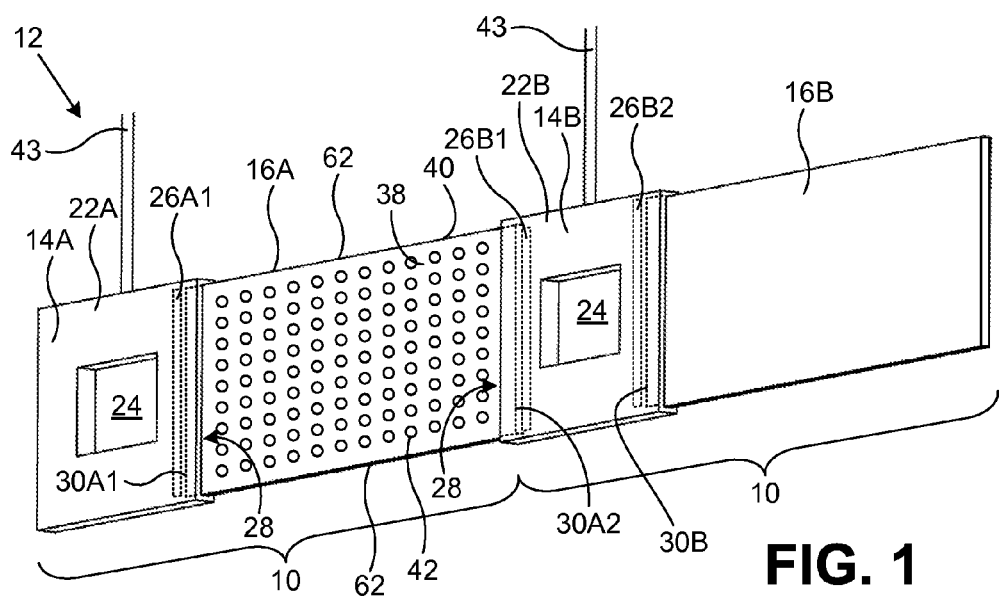
FIG. 1 is a schematic view of an exemplary modular lighting assembly.

Embodiments will now be described with reference to the drawings, wherein like reference numerals are used to refer to like elements throughout. Reference numerals without appended letters refer to corresponding elements generically whereas reference numerals with appended letters refer to individual elements. The figures are not necessarily to scale. Features that are described and/or illustrated with respect to one embodiment may be used in the same way or in a similar way in one or more other embodiments and/or in combination with or instead of the features of the other embodiments.

Aspects of this disclosure relate to a lighting assembly. Referring to FIG. 1, schematically shown are two lighting assemblies 10 that are combined to form a modular lighting assembly 12. Each lighting assembly 10 includes a light engine 14 and at least one light guide 16.

Figure 2:
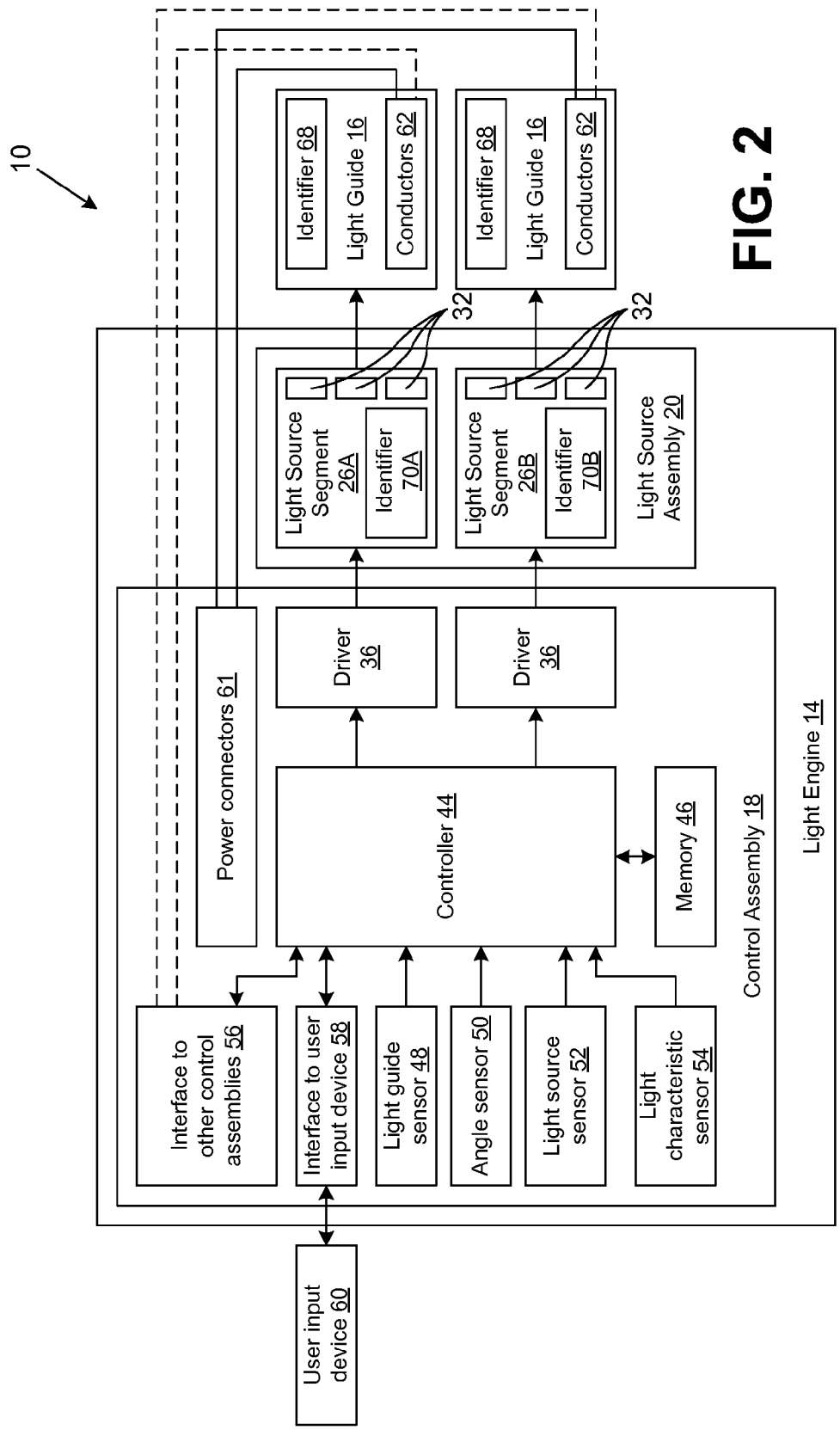
FIG. 2 is a schematic block diagram of a lighting assembly that forms part of the modular lighting assembly of FIG. 1.

With additional reference to FIG. 2, which is a schematic block diagram of the lighting assembly 10, the light engine 14 includes a control assembly 18 (FIG. 2), a light source assembly 20 (FIG. 2), and a coupling member 22 (FIG. 1). The coupling member 22 retains the control assembly 18, the light source assembly 20 and one or more light guides 16. In one embodiment, the coupling member 22 functions as an armature and also functions as a heat sink for heat generated by the light source assembly 20. In one embodiment, the coupling member 22 includes a through hole 24 (FIG. 1) to function as an air passage to assist in cooling of the light source assembly 20. Additional information regarding the construction of the light engine 14 may be found in U.S. Provisional Patent Application No. 61/483,431, filed May 6, 2011 and entitled Lighting Assembly.

Each light engine 14 in the modular lighting assembly 12 is configured to supply light to one or more light guides 16. For this purpose, and with additional reference to FIG. 3, the light source assembly 20 includes at least one light source segment 26 (FIGS. 1, 2 and 3) for each light guide 16 to which the light engine 14 is capable of supplying light. The coupling member 22 also includes a receptacle 28 (FIG. 1) for each retained light guide 16. The receptacle 28 receives a portion of the light guide 16 that includes a light input edge 30 (FIG. 1) of the light guide 16. In one embodiment, the light engine 14 includes at least one light source segment 26 for each for each received light guide 16. For example, a first light engine 14A of the modular lighting assembly 12 of FIG. 1 has one light source segment 26A1 to edge light a first light input edge 30A1 of a first light guide 16A, and a second light engine 14B has a first light source segment 26B1 to edge light a second light input edge 30A2 of the first light guide 16A and a second light source segment 26B2 to edge light a light input edge 30B of a second light guide 16B.

Figure 3:
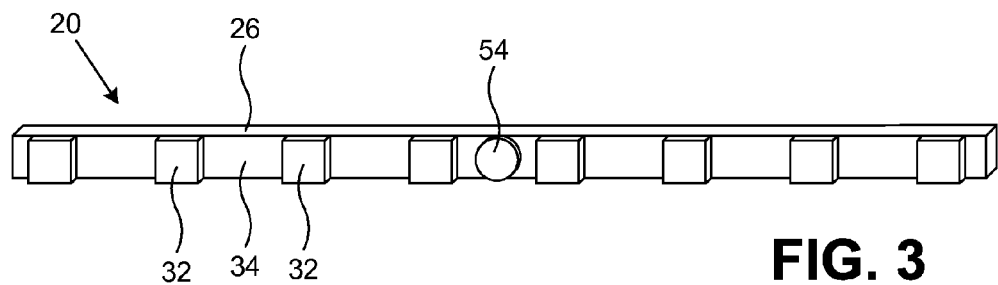
FIG. 3 is a schematic view of a light source assembly for a light engine of the lighting assembly of FIG. 1.

FIG. 3 illustrates one light source segment 26 that is representative of a light source segment 26 that edge lights a respective light input edge 30 of one of the light guides 16. The light source segment 26 includes one or more light sources 32. Each light source 32 is typically embodied as one or more solid-state devices. In one embodiment, the light sources 32 are mounted to a printed circuit board (PCB) 34. The PCB 34 is thermally conductive to conduct heat that is generated by the light sources 32. It is possible that the control assembly 18 for a light engine 14 is implemented in circuitry that is also mounted to the PCB 34 of one of the light source segments 26 retained by the light engine 14. The circuitry of the control assembly 18 includes appropriate analog and/or digital circuit components, as will be described.

Exemplary light sources 32 include solid-state devices such as LEDs, laser diodes, and organic LEDs (OLEDs). In an embodiment where each light source 32 is one or more LEDs, the LEDs may be top-fire LEDs or side-fire LEDs, and may be broad spectrum LEDs (e.g., emit white light) or LEDs that emit light of a desired color or spectrum (e.g., infra-red light, red light, green light, blue light, or ultraviolet light). In one embodiment, the light source 32 emits light with no operably-effective intensity at wavelengths greater than 500 nanometers (nm) (i.e., the light source 32 emits light at wavelengths that are predominantly less than 500 nm). In such embodiments, phosphors (not shown) convert at least part of the light emitted by the light source 32 to longer-wavelength light. Referring to FIG. 2, the control assembly 18 includes a driver 36 for each light source segment 26. The driver 36 is controlled by a control signal to deliver a drive signal to the corresponding light source segment 26, and hence each light source 32, so as to cause the light sources 32 to generate light. The drive signal varies an amount of power that is applied to the light source 32 to vary the light output of the light source 32 (e.g., from zero light output, or off, to a maximum light output of the light source 32).

Light from the light sources 32 of the light source segment 26 is input into the light guide 16. The light guide 16 is a solid article made from, for example, acrylic, polycarbonate, glass, or another appropriate material. The light guide 16 also may be a multi-layer light guide having two or more layers. The light guide 16 has opposed major surfaces 38 and 40. Depending on the configuration of the light guide 16, the light guide 16 has at least one light input edge 30.

As indicated, in the modular lighting assembly 12 shown in FIG. 1, each light guide 16A, 16B has one or more light input edges 30 to receive light from the light source segments 26 of one or both light engines 14A, 14B. In this case, the first light input edge 30A1 of the light guide 16A is received and secured by a coupling member 22A of the first light engine 14A and a second light input edge 30A2 of the light guide 16A is received and secured by a coupling member 22B of the second light engine 14B. The light input edges 30A1 and 30A2 are respectively edge lit by the light source segment 26A2 of the first light engine 14A and the light source segment 26B1 of the second light engine 14B. That is, at each light input edge 30A1, 30A2, light from the respective light source segment 26A2, 26B1 is input into the light guide 16A through the light input edges 30A1 and 30A2. For this purpose, light output from each light source segment 26A2, 26B1 is directed toward the respective light input edge 30A, 30B. Additional optical elements (e.g., lenses, reflectors, etc.) adjacent one or both of the light source segments 26 and the light input edges 30A, 30B may be present to assist in inputting the light into the light guide 16A. The light guide 16B is received and secured by the coupling member 22B of the second light engine 14B. The light input edges 30B of the second light guide 16B is edge lit by the light source segment 26B2 of the second light engine 14A. The edge of the second light 16B distal the light input edge 30B is not connected to another light engine 14 and, consequently, is edge lit only along the light input edge 30B.

The light guides 16 shown in the appended figures are generally rectangular. But other shapes are possible, and the light guides 16 need not be planar. Other exemplary, but not illustrated, light guide shapes include a disk, a dome, a hollow cylinder, a hollow and frustrated cone or pyramid, or a globe or a shape approximating the bulbous shape of a conventional incandescent bulb, each configured to include one or more light input edges. In one embodiment, a three dimensional configuration for the light guide 16 is established using planar or curved light guides that are arranged in a three-dimensional geometric (e.g., polygonal) configuration. In the case where the light guide 16 is basically rectangular (e.g., the illustrated embodiments), the light guide 12 has four edges. Other geometries for the light guide 16 result in a corresponding number of edges. Depending on the geometry of the light guide 16, each edge may be straight or curved, and adjacent edges may meet at a vertex or join in a curve.

Once input into the light guide 16, the light propagates through the light guide 16 by total internal reflection (TIR) at the opposed major surfaces 38, 40. For purposes of this disclosure, any light input surface of the light guide 16 is considered a light input edge, even if it is located on one of the major surfaces 38, 40 or forms part of a light turning and/or homogenizing structure of the light guide 16 to introduce light between the major surfaces 38, 40 in a manner that allows the light to propagate along the light guide 16 by total internal reflection at the major surfaces 38, 40.

Length and width dimensions of each of the major surfaces 38, 40 are much greater than, typically ten or more times greater than, the thickness of the light guide 16. For instance, in the rectangular embodiments shown in the appended figures, the length (measured from the light input edge 30 to an opposite edge distal the light input edge 30) and the width (measured along the light input edge 30) of the light guide 16 are both much greater than the thickness of the light guide 16. The thickness is the dimension of the light guide 16 in a direction orthogonal to the major surfaces. The thickness of the light guide 16 may be, for example, about 0.1 millimeters (mm) to about 10 mm. The light guide 16 may be rigid or flexible.

The light guide 16 includes light-extracting elements 42 (shown schematically in FIG. 1 as circles) in or on at least one of the major surfaces 38, 40. Light-extracting elements 42 that are in or on a major surface 38, 40 will be referred to as being "at" the major surface 38, 40. Each light-extracting element 42 functions to disrupt the total internal reflection of the propagating light that is incident on the light-extracting element 42. In one embodiment, the light-extracting elements 42 reflect light toward the opposed major surface so that the light exits the light guide 16 through the opposed major surface. Alternatively, the light-extracting elements 42 transmit light through the light-extracting elements 42 and out of the major surface 38, 40 of the light guide 16 having the light-extracting elements. In another embodiment, both of these types of light-extracting elements 42 are present. In yet another embodiment, the light-extracting elements 42 reflect some of the light and refract the remainder of the light incident thereon. Therefore, the light-extracting elements 42 are configured to extract light from the light guide 16 through one or both of the major surfaces 38, 40. The light-extracting elements 42 may be arranged to output light over part or all of one or both of the major surfaces 38, 40.

The light-extracting elements 42 may be at one or both of the major surfaces 38, 40 through which light is emitted, or at the opposite major surface 38, 40. Light guides having such light-extracting elements 42 are typically formed by a process such as stamping, molding, embossing, extruding, laser etching, chemical etching, or another suitable process. Light-extracting elements 42 may also be produced by depositing curable material on the light guide 16 and curing the deposited material using heat, UV-light or other radiation. The curable material can be deposited by a process such as printing, ink jet printing, screen printing, or another suitable process. Alternatively, the light-extracting elements 42 may be inside the light guide between the major surfaces 38, 40 (e.g., the light-extracting elements 42 may be light redirecting particles and/or voids disposed in the light guide).

The light-extracting elements 42 are configured to extract light in a defined intensity profile, such as a uniform intensity profile, over the relevant major surface 38, 40 and/or to extract light in a defined light ray angle distribution. Using variations in the light-extracting elements 42, the major surfaces 38, 40, or portions thereof, can have different intensity profiles and/or light ray angle distributions. Intensity profile refers to the variation of intensity with position within a light-emitting region (such as the area of the major surface 38, 40 from which light is emitted). Light ray angle distribution refers to the variation of intensity with ray angle (typically a solid angle) of light emitted from a light-emitting region (such as the area of the major surface 38, 40 from which light is emitted).

Exemplary light-extracting elements 42 include light-scattering elements, which are typically features of indistinct shape or surface texture, such as printed features, ink jet printed features, selectively-deposited features, chemically etched features, laser etched features, and so forth. Other exemplary light-extracting elements 42 include features of well-defined shape, such as V-grooves, lenticular grooves, and features of well-defined shape that are small relative to the linear dimensions of the major surfaces 38, 40, which are referred to herein as micro-optical elements. The smaller of the length and width of a micro-optical element is less than one-tenth of the larger of the length and width of the light guide 16, and the larger of the length and width of the micro-optical element is less than one-half of the smaller of the length and width of the light guide 16. The length and width of the micro-optical element are measured in a plane parallel to the major surface 38, 40 of the light guide 16 for flat light guides 16 or along a surface contour for non-flat light guides 16.

Micro-optical elements are shaped to predictably reflect light or predictably refract light. However, one or more of the surfaces of the micro-optical elements may be modified, such as roughened, to produce a secondary effect on light output. Exemplary micro-optical elements are described in U.S. Pat. No. 6,752,505 and, for the sake of brevity, will not be described in detail in this disclosure. The micro-optical elements may vary in one or more of size, shape, depth or height, density, orientation, slope angle, or index of refraction such that a desired light output from the light guide 16 is obtained over the corresponding major surface 38, 40.

As indicated, the lighting assembly 10 includes the light engine 14. The coupling member 22 of the light engine 14 functions to retain the light guide 16 and to retain, as part of the light engine 14, the light source segment 26. In addition, the light engine 14 aligns the light input edge 30 with the light source segment 26 in an arrangement for inputting light from the light source segment 26 into the light input edge 30. Additionally, the light engine 14 dissipates heat that is generated by the light source segment 26.

The coupling member 22 is supported in an appropriate manner and so that the light guide 16 has a desired orientation. For instance, the coupling member 22 may be coupled to an architectural surface (e.g., a wall or a ceiling) by a retaining member 43. In the embodiment of FIG. 1, the retaining member 43 is a cable (e.g., "aircraft cable"). Other exemplary retaining members 43 include a track, a pole, a rod, a wire, electrical wire that supplies electricity to the lighting assembly 10, screws, a bracket, etc. In other embodiments, the lighting assembly 10 may be embodied as a floor lamp, a table lamp, a task light, or other lighting device.

Different types of light guides 16 may be used with the light engine 14. Also, different types of light source assemblies 20 or light source segments 26 may be used in the light engine 14. Also, depending on how the modular light assembly 12 is arranged, the light guide 16 may be edge lit at one or more than one light input edge 30. In still other embodiments, the light engine 14 may light two or more light guides 16, and the angle between the light guides 16 may be varied. The user of the modular lighting assembly 12 may also be interested in obtaining different illumination profiles from the modular lighting assembly 12. For these reasons, it may be desirable to control the light generated by the light sources 32 to achieve desired light output characteristics from the modular lighting assembly 12 as a whole.

Control over the light sources 32 will now be described for a number of operational situations with reference to FIG. 2. To effectuate control over the light sources 32, the control assembly 18 includes a controller 44. In an embodiment, the controller performs (e.g., carries out) logical operations, typically in response to instructions (e.g., by executing executable code) that is stored on a non-transitory computer readable medium (e.g., a magnetic, optical or electronic memory). In the illustrated embodiment, the controller 44 is a microcontroller and, in other embodiments, the controller 44 is a general-purpose processor or an application specific integrated circuit (ASIC). The control assembly 18 of the illustrated embodiment includes a memory 46 for storing data and executable instructions. At least part of the memory 46 may be embedded within the controller 44.

The control assembly 18 includes at least one sensor for detecting various conditions (e.g., operational states corresponding to program objects) associated with the modular lighting assembly 12. Exemplary sensors include a light guide sensor 48, an angle sensor 50, a light source sensor 52, and a light characteristic sensor 54. Additional details of the sensors will be described below in connection with control functions of the control assembly 18.

In one embodiment, the control assembly 18 is configured to communicate with other electronic devices, such as control assemblies 18 of other light engines 14 in the modular lighting assembly 12 or a user input device 60. For this purpose, the control assembly 18 includes an interface 56 that establishes operative communication with one or more other control assemblies 18 and an interface 58 that establishes operative communication with a user input device 60. The user input device 60 receives input commands from an operator (e.g., a user) and the user input device 60 communicates those commands to the controller 44 via the interface 58 to effectuate control over the modular lighting assembly 12. Exemplary user input devices 60 include a keypad, a dedicated control panel for the modular lighting assembly 12, a portable electronic device (e.g., a mobile phone, a tablet computer, etc.), a computer, or other similar device. In other embodiments, the interface 58 receives input commands from an automated source, such as a computer that is programmed to control the lighting assembly 10.

The light engine 14 receives electrical power to operate the control assembly 18 and illuminate the light sources 32 via power connectors 61. The power connectors 61 of at least one of the light engines 14 in the modular lighting assembly 12 are configured to connect to electrical wires (not shown) that connect to a power outlet, a building's electrical system, or another source of electrical power.

Additional power connectors 61 of the light engine 14 are configured to connect to electrical conductors that connect to power connectors 61 in another light engine 14 of the modular lighting assembly 12. In this manner, electrical power may be fed from one light engine 14 to another light engine 14 in the modular lighting assembly 12. Electrical power may be distributed through the modular lighting assembly 12 in a daisy-chain arrangement.

In one embodiment, the light guide 16 includes electrical conductors 62 that establish an electrical pathway between a pair of light engines 14. With brief departure to the embodiment of FIG. 1, one conductor 62 is attached to a side edge of the light guide 16 and a second conductor 62 is attached to an opposite side edge of the light guide 16. In other embodiments, the conductors are located on one or both of the major surfaces 38, 40. The conductors 62 are typically implemented using metal wires or films, but could be implemented using conductive particles in a binder or another suitable way. Near the light input edge 30 of the light guide 16, the conductors 62 are located so that when the light guide 16 is inserted into the receptacle 28 of the coupling member 22, the conductors 62 make physical and electrical contact with corresponding ones of the connectors 60.

With continuing reference to FIG. 2, the conductors 62 alternatively or additionally may be used by light engines 14 as signaling conductors to exchange data signals between the respective control assemblies 18. In this embodiment, the interface 56 couples the data signals to the conductors 62 as represented by dashed lines in FIG. 2. Therefore, in one embodiment, there are conductors 62 for the distribution of power, in one embodiment, there are conductors 62 for the exchange of data signals, in one embodiment, there are separate conductors 62 respectively for the distribution of power and for the exchange of data signals, or in one embodiment, there are conductors 62 for the distribution of power and data signals are optionally superposed on the conductors 62 for power distribution. Other ways of communicating between or among light engines 14 are possible and the interfaces 56 may be configured accordingly. Exemplary communication techniques include optical communication (e.g., via infrared (IR) or visible light transceivers), wireless communication (e.g., via radio frequency (RF) transceiver such as BLUETOOTH®, WiFi), or signal exchange through conductors that travel between light engines 14 along paths other than through or on the light guide 16. In the case of optical communication, signals may be exchanged through the light guide 16.

Figure 4:
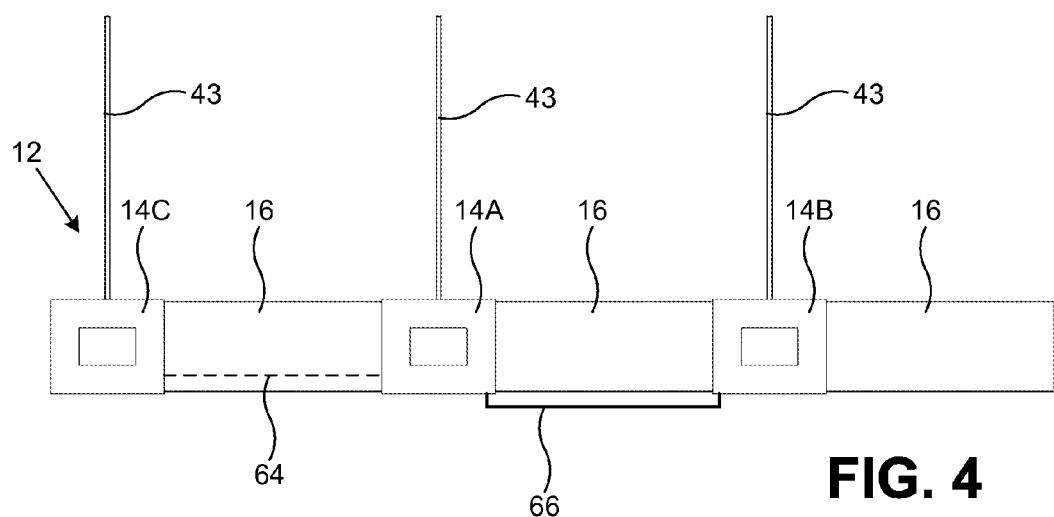
FIG. 4 is a schematic view of another modular lighting assembly.

With brief departure to FIG. 4, other types of conductors between pairs of light engines 14 are illustrated. In one embodiment, conductors 64 (represented by a broken line in FIG. 4) are embedded in a light guide 16 so as to extend between light engines 14A and 14C. In other embodiments, the conductors extend between light engines 14 externally of the light guide 16. For example, conductors 66 (represented with a bold line in FIG. 4) extend between the light engines 14A and 14B externally of the light guide 16. In other examples, a conductor (not shown) extends between the light engines 14 through the retaining members 43.

With continuing reference to FIG. 2, in one embodiment, the control assembly 18 is configured to detect the presence or absence of a light guide 16 in a receptacle 28 (FIG. 1) of the light engine 16. When a light guide 16 is not present, the control assembly 18 maintains each light source 32 in the light source segment 26 for the receptacle 28 that does not have a light guide 16 in an off state. When a light guide 16 is present, the control assembly 18 turns on one or more of the light sources 32 in the light source segment 26 for the receptacle 28 in which the light guide 16 is present to edge light the light guide 16. The number of light sources 32 that are turned on and the output intensity of the light sources 32 depend on a desired intensity output from the light guide 16 and the light guide type.

The presence or absence of the light guide 16 is detected by the light guide sensor 48. In one embodiment, the light guide sensor 48 is as simple as a switch that is forced to close or open when the light guide 16 is installed in the receptacle 28. Other light guide sensors 48 include an optical detector that senses a change in light based on presence or absence of the light guide 16. Presence or absence of the light guide 16 alternatively may be communicated to the control assembly 18 by a user via the user input device 60 and interface 58. Other, more sophisticated, light guide sensors 48 will be described in the following paragraphs.

As indicated, it may be desirable to coordinate light output by the light source segment 26 and other operations of the light engine 14 with the type of light guide 16 that is positioned to receive light from the light source segment 26. In this manner, one light engine 14 may be used with multiple light guide types. Light guide type may be defined by one or more characteristics of the light guide 16. These characteristics include, but are not limited to, size of the light guide 16 (e.g., length of the light guide 16 in a direction extending from the light input edge 30, or a fraction of the width of the receptacle 28 that the light guide 16 occupies), configuration of light extracting elements 42, presence or absence of conductors 62 for coupling of power between light engines 14, presence or absence of conductors 62 for exchanging data signals between light engines 14, number and position of light input edges, color filtering or wavelength shifting features of the light guide 16, the directionality of the light guide 16 (e.g., whether the light guide is configured to extract light input through only one light input edge or through more than one light input edge), and so forth.

The light guide type may be communicated to the control assembly 18 by a user via the user input device 60 and interface 58. This user may be an end user of the modular lighting assembly 12, an installer of the modular lighting assembly 12, or a manufacturer of the modular lighting assembly 12 or components thereof. Alternatively, the light guide type is detected by the light guide sensor 48. In one embodiment, the light guide 16 includes an identifier 68 that is read or sensed by the light guide sensor 48. The identifier 68 may provide a value that is used in conjunction with stored information to determine the characteristics of the light guide 16 or may directly convey information about the characteristics of the light guide 16. The light guide sensor 48 is configured to be compatible with the identifier 68. Exemplary light guide sensors 48 and identifiers 68 include a radio frequency identification (RFID) reader and RFID tag; a barcode reader and a barcode; a microchip reader and a microchip where connection between the reader and the microchip is established with conductors, wirelessly by a radio frequency signal, or optically; a memory reader and a memory (e.g., a flash memory or other non-transitory memory retained by the light guide 16); and an optical reader and an optically readable pattern on the light guide 16 (e.g., an etched pattern, a pattern of deposited material, etc.). In another embodiment, the light guide sensor 48 is a series of pairs of electrical contacts and the identifier 68 is a series of electrical conductors that are arranged to selectively bridge pairs of the contacts based on the light guide type. The electrical conductors effectively form a "readable" pattern of conductive strips. The control assembly 18 identifies the pairs of bridged contacts to determine the light guide type or the light guide characteristics. In another embodiment, the light guide sensor 48 includes a series of switches or pressure sensors and, as the identifier 68, the light guide 16 includes a pattern of protrusions or indentations that selectively close (or open) the switches or make contact with the pressure sensors based on the light guide type. The control assembly 18 identifies which switches or pressure sensors that are affected by the light guide 16 to determine the light guide type or the light guide characteristics.

The light input to the light guide 16 is coordinated with the light guide type. For instance, to produce a defined illuminance at the major surface of the light guide, a longer light guide 16 is edge lit with a greater intensity of light than a shorter light guide 16. The intensity of the light may be controlled by one or both of controlling the number of light sources 32 of the light source segment 26 that are turned on or by controlling the intensity of the light input to the light guide 16 from each light source 32. Varying a drive current that is applied to the light sources 32 by the driver 36 may be used to vary the intensity of light input to the light guide 16. As another example, a light guide 16 with a first arrangement of light extracting elements 62 may be edge lit with a combination of light sources 32 positionally matched to the first arrangement of light extracting elements, and a second arrangement of light extracting elements 62 may be edge lit with different combination of light sources 32 positionally matched to the second arrangement of light extracting elements. Other light output or control adjustments are made by the control assembly is based on the determination of the light guide type.

More than one type of light source segment 26 may be used in the light engine 14. To coordinate operation of the control assembly 18 with the light source segment 26, the control assembly 18 determines the type of the light source segment 26. The light source segment type may be communicated to the control assembly 18 by a user via the user input device 60 and interface 58. This user may be an end user of the modular lighting assembly 12, an installer of the modular lighting assembly 12, or a manufacturer of the modular lighting assembly 12 or components thereof. Alternatively, the light source segment type is represented by a light source segment identifier 70 that is read by the light source sensor 52 (e.g., each light source segment 26A and 26B has a corresponding light source segment identifier 70A and 70B that is read by the light source sensor 52). Parameters of the light source segment represented by the light source segment type include an identity of the light sources 32 of the light source segment 26, the number of light sources 32, the physical layout of the light sources 32, the electrical power requirements of the light sources 32, the light output characteristics of the light sources 32, including intensity of the emitted light per unit of drive current and spectral characteristics of the emitted light. In one embodiment, the control assembly 18 identifies the light source segment type (e.g., as indicated by a reference number or code) and determines the corresponding characteristics of the light source segment 26 using a look-up table or database that is stored in the memory 46. In another embodiment, the characteristics of the light source segment 26 are determined directly from the light source segment 26 (e.g., from the identifier 70). The light source sensor 52 and the light source segment identifier 70 may be embodied in any suitable manner, including the above-described manners of implementing the light guide sensor 48 and the identifier 68.

In one embodiment, the control assembly 18 stores one or both of a parameter set for driving the light sources 32 based on the identified type of the light source segment 26 and a parameter set for driving the light sources 32 based on the identified type of the light guide 16. Using the stored parameters, the controller 44 is configured to adjust the drive signal output by the drivers 36 to the light sources 32 based on the identified type of the light guide 16 and/or the identified type of the light source segment 26. In another embodiment, characteristics of the light source assembly 20 are identified for the light source assembly 20 as a whole, rather than at the light source segment 26 level.

In some instances, one of the light guides 16 in the modular lighting assembly 12 is edge lit by one light engine 14. As an example, in the illustration of FIG. 1, the light guide 16B is supplied with light from the connected light engine 14B. In this situation, all of the light available to the light guide 16B is generated by one light source segment 26B2 under the control of the control assembly 18 in the corresponding light engine 14B. The control assembly 18 controls a corresponding driver 36 and, in turn, the corresponding light sources 32, to generate light in a manner that produces a desired light intensity from the light guide 16B.

In other instances, the light guide 16 is edge lit with two or more light engines 14. As an example, in the illustration of FIG. 1, the light guide 16A is provided with light from two light engines 14A and 14B. In this situation, if each light engine 14A, 14B that inputs light into the light guide 16A were to input light into the light guide 16A as if it were the only light engine to supply light to the light guide 16A, then the intensity of the light output by the light guide 16A would be twice obtained with the light guide 16A illuminated by only one light engine 14A or 14B. Therefore, the control assembly 18 of at least one of the light engines 14A, 14B is configured to coordinate its light generation with that of any other light engine that supplies light to the same light guide.

In one embodiment, the coordination is implemented by communication between the control assemblies 18. Communication may take place as an exchange of data signals between the control assemblies 18. In one embodiment, one of the control assemblies 18 assumes a master role and another of the control assemblies 18 assumes a slave role in which the master control assembly 18 issues operating commands to the slave control assembly 18. Light generation by the light source assembly 20 in, e.g., the light engine 14A having the slave control assembly 18 is controlled by the operating commands received from the master control assembly 18. In another embodiment, the detection of another light engine 14A connected to the light guide 16A is used as an input command to change the intensity of the light generated by the light source segment 26B1 of the light engine 14B and input to the light guide 16A. For instance, in the case where conductors 62 are present, the light engine 14A may place a detectable load on the conductors 62 or signal to the light engine 14B via the conductors 62. If the light engine 14A is present, it may be assumed that the light engine 14A will input light into the light guide 16A. Under this assumption, each of the light engines 14A, 14B reduces its light output to the light guide 16A by one half, or one light engine 14A, 14B does not input light into the light guide 16A and allow the other light engine 14B, 14A to edge light the light guide 16A.

In another embodiment, the control assembly 18 of the light engine 14B detects the presence of a second light engine 14A that inputs light into the light guide 16A using the light characteristic sensor 54 (FIGS. 2 and 3). For this purpose, the light characteristic sensor 54 is a photo-detector (e.g., a photodiode) that is configured to detect light directed toward the light engine 14B by another light engine 14A through the light guide 16A. In one embodiment, the light characteristic sensor 54 is positioned adjacent the light input edge 30B of the light guide 16A to detect light that exits the light input edge 30B in a direction toward the light engine 14B. In the embodiment of FIG. 3, for example, the light characteristic sensor 54 is mounted to the PCB 34 with the light sources 32 of the light source segment 26B1. In one embodiment, the controller 44 adjusts the drive signal output by the driver 36 to the light sources 32 based on an intensity of incident light detected by the sensor 54. In one embodiment, when the light characteristic sensor 54 detects light of an intensity above a predetermined threshold, a determination is made that light is input into the light guide 16A by another light engine 14A. In this case, the control assembly 18 reduces the intensity of light input into the light guide 16A (e.g., to one half of the intensity that the light engine 14B would have produced had there been no detection of light from the other light engine 14A). The other light engine 14A makes the same determination and also reduces its light output. Therefore, the light guide 16A outputs light with a desired intensity regardless of the number of light engines coupled and inputting light to light guide 16A.

The light characteristic sensor 54 may be used for other purposes. The light characteristic sensor 54 may be configured to detect light from the environment surrounding the modular lighting assembly 12 rather than or in addition to light directed toward the light engine 14B through the light guide 16A. In that case, the light characteristic sensor 54 may additionally include, or alternatively may be, an ambient light sensor that is mounted on the coupling member 22 (or other location, possibly apart from the modular lighting assembly 12) with an orientation to detect light from a desired location (e.g., one of the light guides 16 or a surface illuminated with the modular lighting assembly 12). In one embodiment, the light characteristic sensor 54 detects ambient light level and the control assembly 18 adjusts light output by the light sources 32 in accordance with the detected level of ambient light to control the overall light level in the space illuminated by the modular lighting assembly 12.

In one embodiment, the light characteristic sensor 54 detects the color of light and the control assembly 18 adjusts light output from the light sources 32 in accordance with the detected light color to control the color of light in the space illuminated by the modular lighting assembly 12. In one embodiment, color adjustment is made in response to the detection of the color of ambient light. In another embodiment, color adjustment is made in response to the detection of the color of light exiting the light guide from the light input edge 30. For this purpose, the light source segments 26 include light sources 32 of different colors controlled to emit light at different intensities. The light from the light sources of different color combines to provide light of a desired color from the modular lighting assembly 12. The different color light sources 32 may include a combination of light sources selected from broad-spectrum white light sources, white light sources that are skewed toward outputting red light (e.g., "warm" light sources), white light sources that are skewed toward outputting blue light (e.g., "cool" light sources), red light sources, blue light sources, green light sources, and so forth.

In one embodiment, the light characteristic sensor 54 is a pixelated sensor. An exemplary pixelated sensor has two or more photo-detectors arranged in a one- or two-dimensional array, or some other configuration. Exemplary pixelated sensors include a CMOS sensor, a charge-coupled device (CCD) sensor, or other active-pixel sensor (APS). In one embodiment, a grating is placed in front of the pixelated sensor. The grating splits incident light into spectral bands that are separately detected by the pixels of the sensor 54. Analysis of the output of the sensor 54 can be used to determine the spectrum of the incident light.

In one embodiment, a pixelated version of the light characteristic sensor 54 is used as an ambient light sensor to assess light produced by the modular lighting assembly 12 and incident on a surface. Analysis of the output from the sensor 54 determines the intensity or color of the light or the area covered by the light on the surface, and to adjust the light output by the light source assembly 20 to achieve a desired intensity or illumination coverage, if not already obtained.

A number of additional functional operations of the light engine 14 are possible. As indicated, in one embodiment, two or more control assemblies 18 coordinate operation of the light sources 32. For this purpose, data signals are exchanges between or among the control assemblies 18. The coordination between or among the control assemblies 18 may include discovery of the configuration of the modular lighting assembly 12. The configuration of the modular lighting assembly 12 may include one or more of: the number of light guides 16, the type of each light guide 16, the number of light engines 14, the number and type of light source segment 26 in each light engine 14, the characteristics of each light source segment 26, and the relationship between the light source segments 26 and their respective light input edges 30 of the light guides 16. Once this information is determined, light emission from the light sources 32 is controlled to obtain a desired lighting profile from the modular lighting assembly 12. The characteristics that define a lighting profile of the modular lighting assembly 12 include the color, intensity, and spatial and temporal variations of intensity and color of each light guide 16.

A desired lighting profile may be a default lighting profile that is predetermined by a manufacturer. There may be more than one default lighting profile with each default lighting profile corresponding to a different potential configuration of the modular lighting assembly 12. Alternatively, the installer or user of the modular lighting assembly 12 may define one or more predetermined lighting profiles. These predetermined lighting profiles may correspond to different situations, such as time of day, an activity in which the user is engaged, availability of light from other lighting assemblies or ambient sources, and so forth.

The predetermined lighting profiles and any other data used by the control assembly 18 may be stored in the memory 46. The memory 46 may include one or both of volatile and non-volatile components. Also, the memory 46 may include any appropriate drives, readers or players for the data storage component (e.g., media component) of the memory 46.

Various ways to communicate among the control assemblies 18 and between the user input device 60 and the control assembly 18 have been discussed. In one embodiment, the control assembly 18 may interface with a network (not shown) and have a network address (e.g., an internet protocol (IP) address) so as to receive and send data over the network. The network may have a physical backbone (e.g., network cables) or may be wireless. Commands may be transmitted to the control assembly 18 over the network, such as a command to the turn the modular lighting assembly 12 on or off, or a command to use a predetermined lighting profile.

Figure 5:
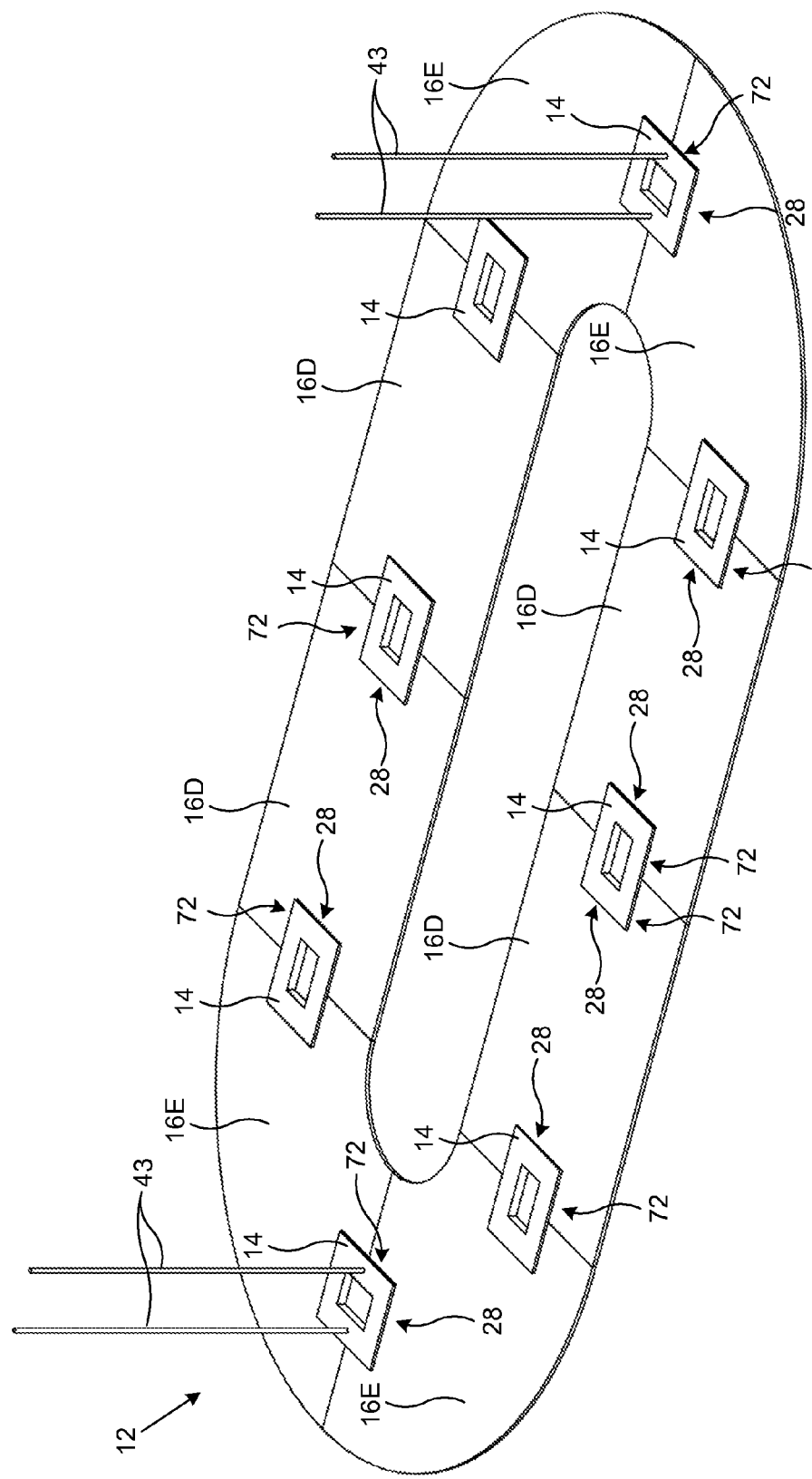
FIG. 5 is a schematic view of another exemplary modular lighting assembly.
Figure 6:
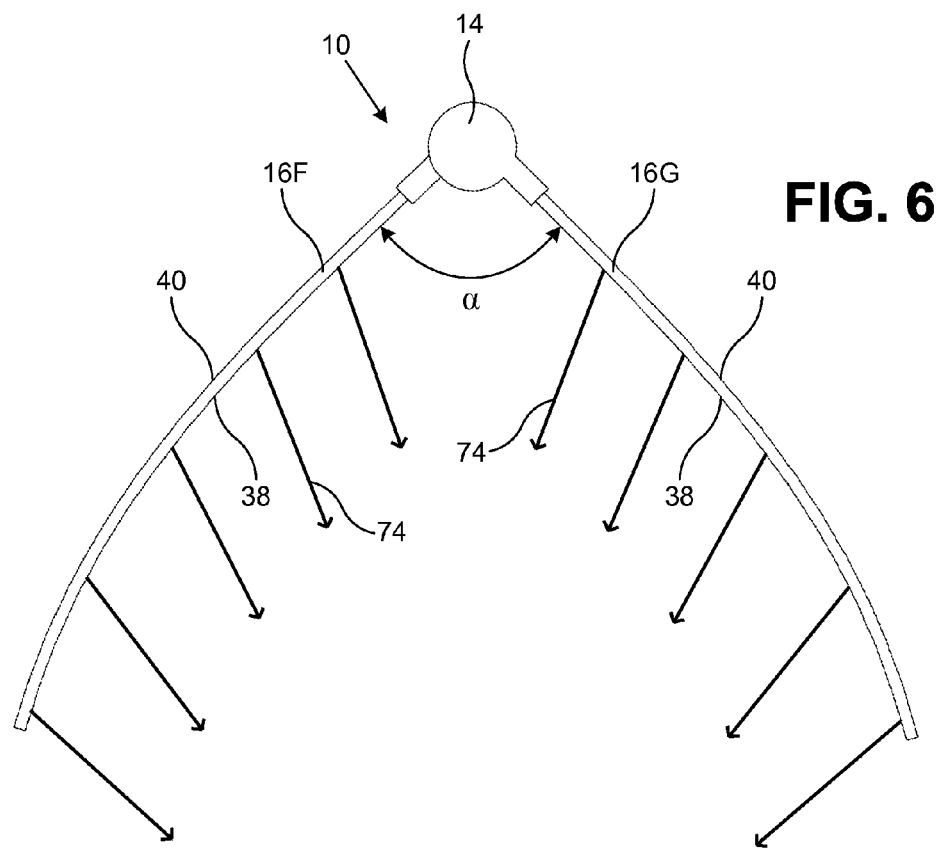
FIGS. 6-10 are schematic views of an exemplary lighting assembly where an angle between light guides is changeable.
Figure 7:
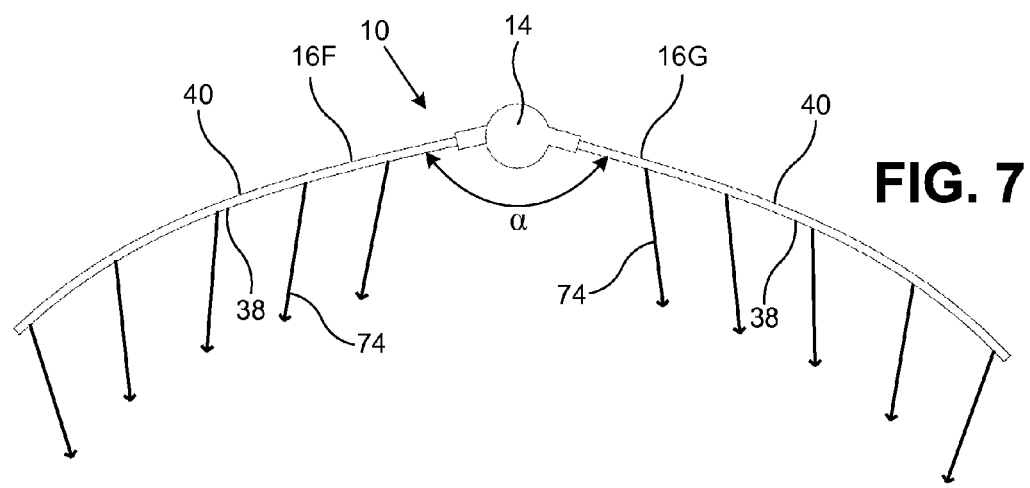

Another exemplary modular lighting assembly 12 is illustrated in FIG. 5. In this embodiment, the modular lighting assembly 12 includes light engines 14 and light guides 16D, 16E that interconnect to form an oval. In the embodiment of FIG. 5, the modular lighting assembly 12 is supported by retaining members 43 that are connected to two of the light engines 14. The two light engines 14 that are connected to the retaining members 43 each support two arcuate light guides 16E and the arcuate light guides 16E are connected to additional light engines 14 that, in turn, support the rectangular light guides 16D. In the illustrated embodiment, the light guides 16D, 16E each includes a notch 72 having edges that are received by the receptacle 28 of a respective light engine 14. At least one edge of the notch 72 forms the light input edge 30 (not shown in FIG. 5). A mechanically stable modular lighting assembly 12 is constructed by interconnecting the light engines 14 and the light guides 16D, 16E. Other configurations and shapes for the modular lighting assembly 12 are possible. The number of configurations is potentially limitless since the configurations can be created with different shaped light guides 16 and light engines 14 of different characteristics and shapes.

In the embodiments illustrated thus far, the light guides 16 of the modular lighting assembly 12 are in the same plane. This need not be the case. The light engine 14 may be configured to retain light guides 16 with an angle between the major surfaces 38, 40 of respective light guides 16, such as 90 degrees, 45 degrees, 30 degrees, or any other desired angle. In some embodiments, such as those shown in FIGS. 1, 3 and 5, the angle between the major surfaces 38, 40 is fixed.

Figure 8:
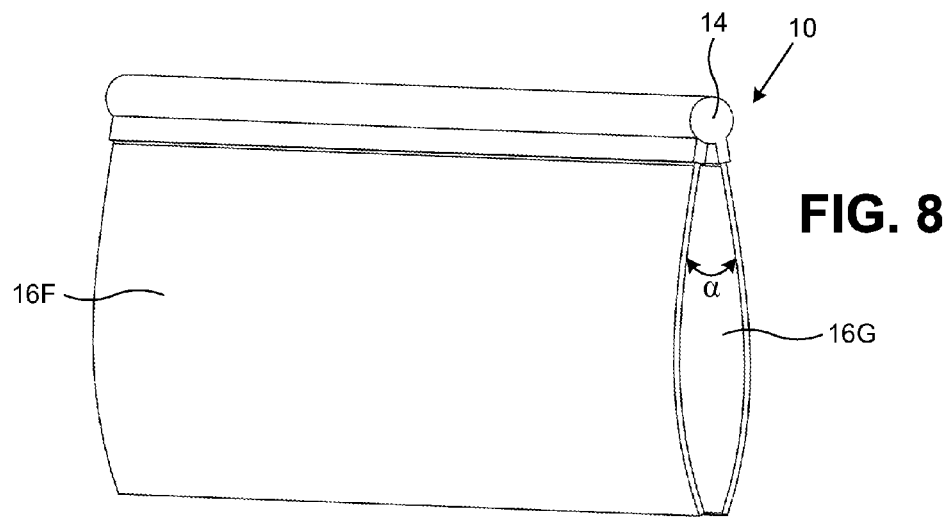
Figure 9:
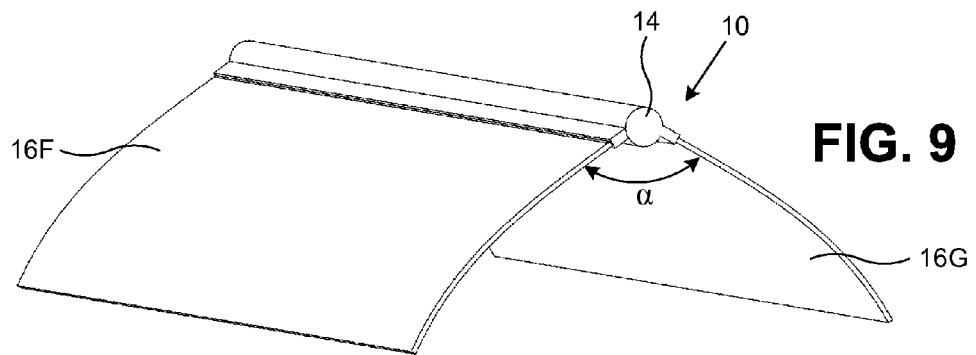
Figure 10:
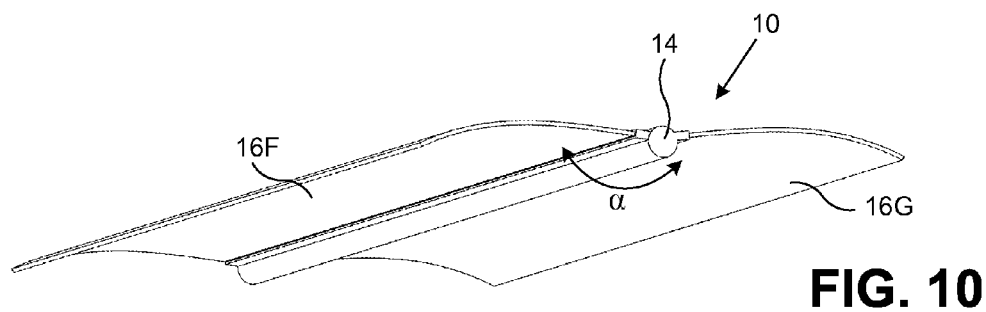

With additional reference to FIGS. 6-10, the angle between major surfaces 38, 40 of two light guides 16F, 16G (collectively referred to as light guides 16) that are retained by a light engine 14 may be adjustable. In these embodiments, the light engine 14 is hinged so that the light guides 16 are pivotable with respect to each other. The angle may be set by the user of the lighting assembly 10. As depicted by arrows 74 in FIGS. 6 and 7 that represent light rays emitted from the major surfaces 38 of the light guides 16, the lighting profile may be changed by changing an angle α (alpha) between the light guides 16. Although not illustrated in FIGS. 6 and 7, light also may be emitted from the major surfaces 40, and the directional properties of the light emitted from the major surfaces 40 would also change in accordance with changes in the angle α between the light guides 16. Changing the angle α also changes the light ray angle distribution of, and the size of the area illuminated by, the lighting assembly 10. FIGS. 8-10 illustrate an example of a lighting assembly 10 in which the angle α between the light guides 16 has been adjusted to different values.

Figure 11:
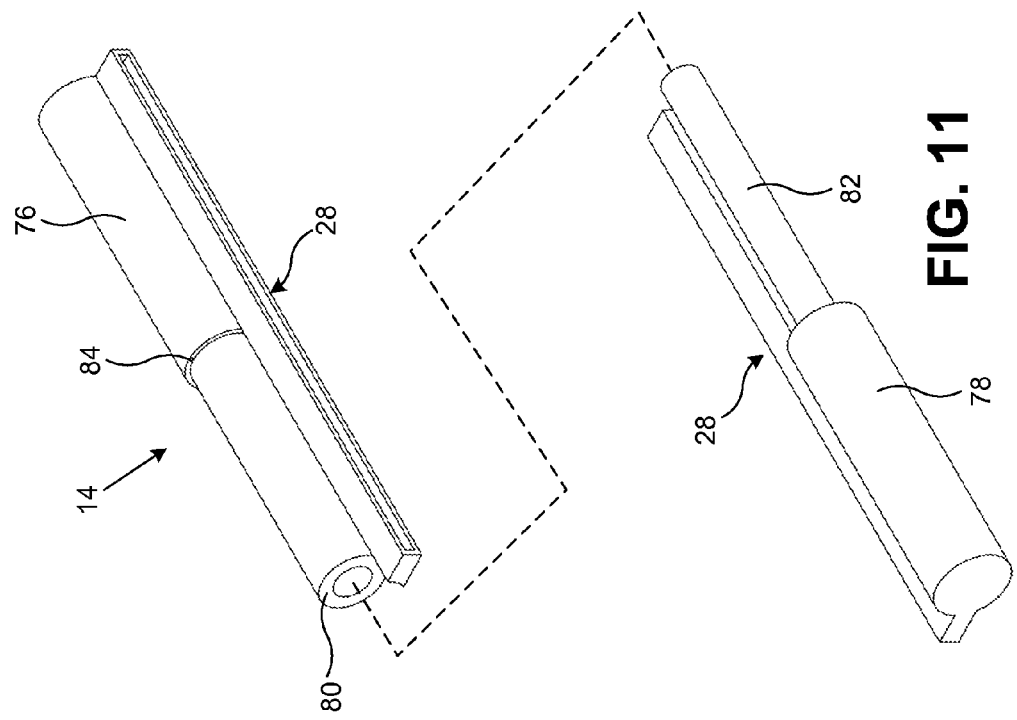
FIG. 11 is an exploded view of an exemplary light engine for the lighting assembly of FIGS. 6-10.

With additional reference to FIG. 11, illustrated is an embodiment of the light engine 14 that retains a first light guide 16F in a first coupling member 76 and a second light guide 16G in a second coupling member 78 (the light guides 16F, 16G are not shown in FIG. 11). The light engine 14 is hinged so that the angle α between the coupling members 76, 78 is adjustable, and hence the angle between the light guides 16F, 16G is adjustable.

Figure 12:
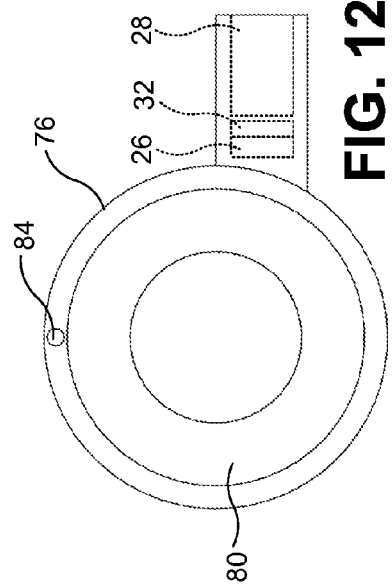
FIG. 12 is an end view of a first coupling member of the light engine of FIG. 11.
Figure 13:
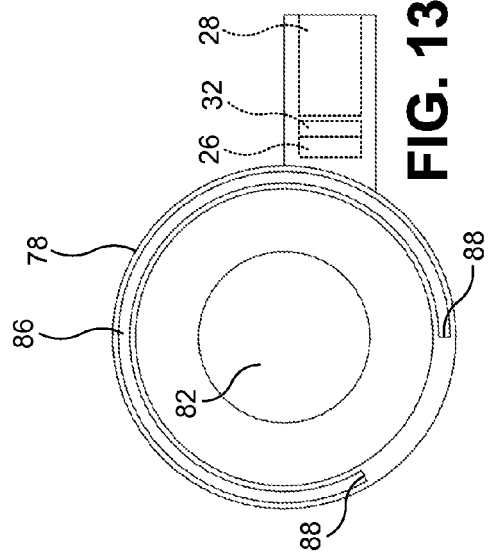
FIG. 13 is an end view of a second coupling member of the light engine of FIG. 11.

To further illustrate the light engine of FIG. 11, opposite end views of the first coupling member 76 and the second coupling member 78 are respectively illustrated in FIGS. 12 and 13. The first coupling member 76 retains the light guide 16F (not shown in FIG. 12) in a receptacle 28 of the first light coupling member 76 and edge lights the light guide 16F with a light source segment 26 of the first light coupling member 76. Similarly, the second coupling member 78 retains the light guide 16G (not shown in FIG. 13) in a receptacle 28 of the second light coupling member 78 and edge lights the light guide 16G with a light source segment 26 of the second light coupling member 78.

The first coupling member 76 includes a sleeve 80 having a cylindrical bore that axially receives a pin 82 of the second coupling member 78. In the illustrated embodiment, the pin 82 and the sleeve 80 are rotatable relative to each other, but the pin 82 is fixed relative to the rest of the second coupling member 78 and the sleeve 80 is fixed relative to the rest of the first coupling member 76. In one embodiment, relative rotation of the first coupling member 76 and the second coupling member 78 is limited. For example, in the illustrated embodiment, the first coupling member 76 includes a limit pin 84 that is axially received in a limit slot 86 of the second coupling member 78. Relative rotation of the first coupling member 76 and the second coupling member 78 stops when the limit pin 84 contacts either end 88 of the limit slot 86. The locations of the ends 88 can be configured to provide a desired range of angular movement, selectable by the user.

In one embodiment, the light sources 32 are controlled in accordance with the angle between light guides 16. For example, when the angle is small, fewer light sources 32 may be illuminated than when the angle is large, or when the angle is small, the intensity of light output by the light sources 32 may be less than when the angle is large. The angle between light guides 16 is defined by the angle between the first coupling member 76 and the second coupling member 78.

The angle between the first and second coupling members 76, 78 is detected by the angle sensor 50 (FIG. 2). The controller 44 controls the light source assembly 20 as a function of the angle α between the light guides 16 in response to the output of the angle sensor 50. In one embodiment, the angle sensor 50 is an analog device, such as a potentiometer. In one embodiment, the pin 84 is coupled to the wiper of the potentiometer and the body of the potentiometer is coupled to the second coupling member 78. In another embodiment, the pin 84 provides the wiper of the potentiometer and the slot 86 contains the resistive element of the potentiometer. As the pin 84 moves in the slot 86, the corresponding change in resistance is detected (e.g., as a corresponding change in voltage or other value input to the controller 44). The angle sensor 50 may be implemented in other manners. Other exemplary angle sensors 50 include rotational encoders and linear encoders incorporating mechanical, optical, or other suitable transducers.

With additional reference to FIGS. 14-17, a modular lighting assembly 12 is formed by connecting together lighting assemblies 10 with hinged light engines 14. In the illustrated embodiments, the modular lighting assembly 12 is formed by connecting one end of a light guide 16 to one hinged light engine 14 and an opposite end of the light guide 16 to another hinged light engine 14. This is repeated for another light guide 16, but in the illustrated embodiment, the two end light guides 16 are connected to only light engine 14. As a result, the modular lighting assembly 12 has an end, or first, light guide 90 connected to a first light engine 92, which is also connected to a second light guide 94. The second light guide 94 is connected to a second light engine 96, which is also connected to a third light guide 98. The third light guide 98 is connected to a third light engine 100, which is also connected to another end, or fourth, light engine 102.

Figure 14:
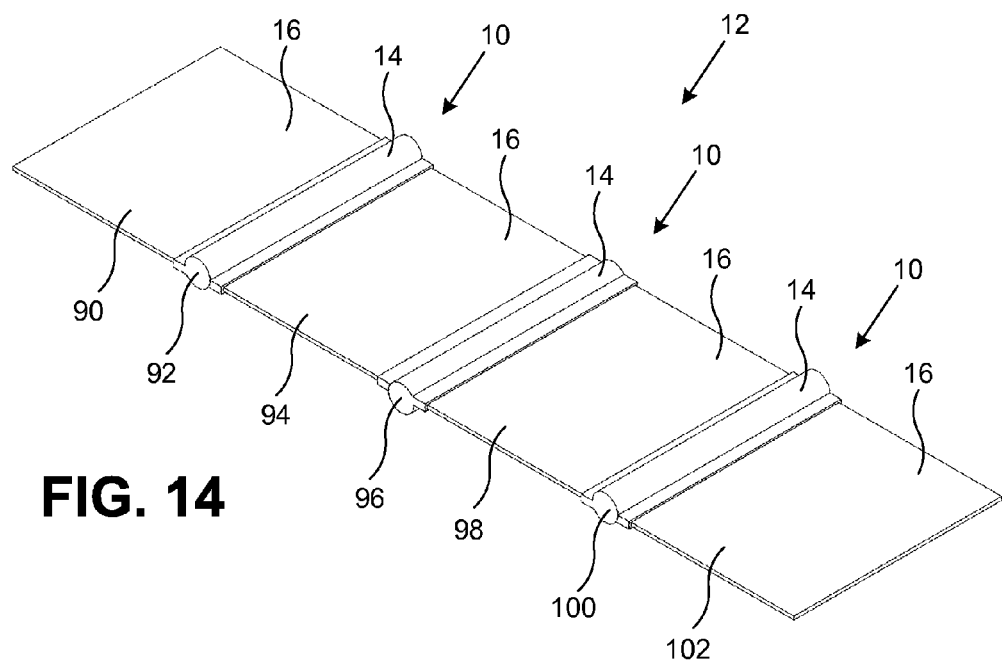
FIG. 14 is a schematic view of another exemplary modular lighting assembly.

In the embodiment of FIG. 14, the modular lighting assembly 12 is shown in an extended configuration. The extended configuration is obtained by positioning the first and second coupling members 76, 78 of the hinged light engines 14 in relative positions so that the angle between adjacent light guides 16 is 180 degrees.

Figure 15:
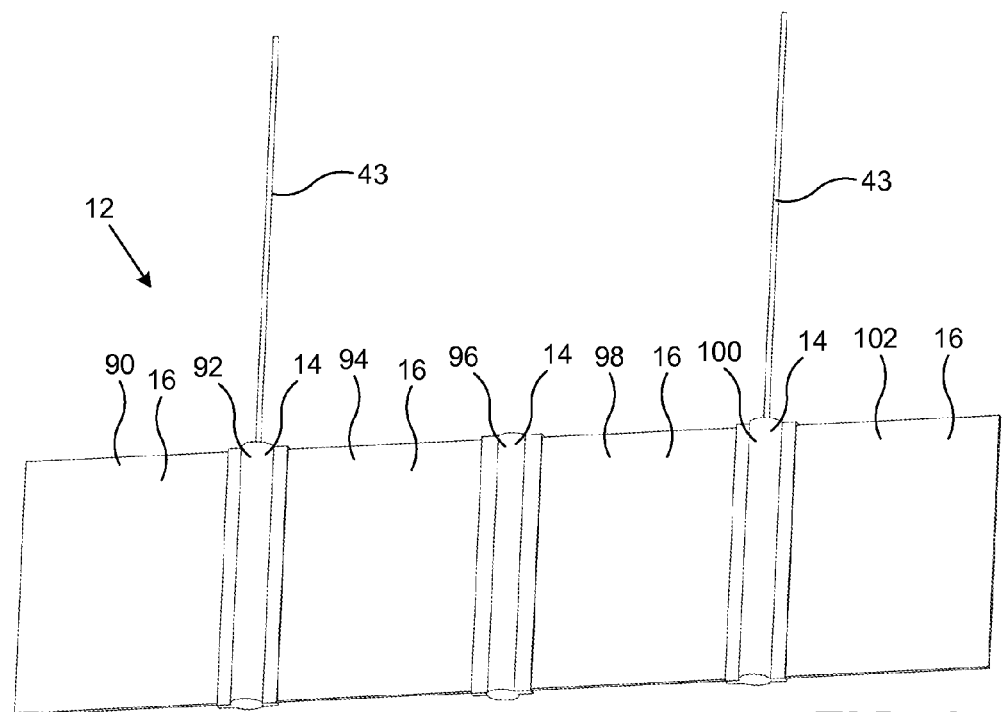
FIG. 15 is a schematic view of the modular lighting assembly of FIG. 14 in a suspended configuration.

In FIG. 15, the modular lighting assembly 12 of FIG. 14 is shown in an extended configuration and vertically mounted using retaining members 43 that are connected to the first and third light engines 92, 100. Alternatively, the modular lighting assembly 12 can be mounted with the light guides 16 horizontal.

Figure 16:
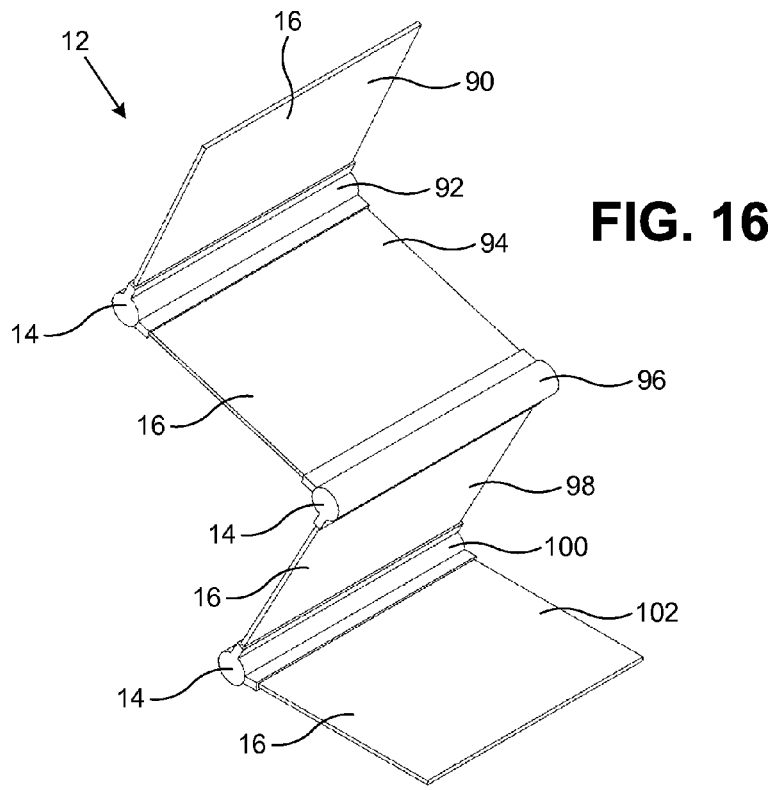
FIG. 16 is a schematic view of the modular lighting assembly of FIG. 14 in a folded configuration.

In FIG. 16, the modular lighting assembly 12 of FIG. 14 is shown in a partially folded configuration. The partially folded configuration is obtained by positioning the first and second coupling members 76, 78 of the hinged light engines 14 in relative positions so that the angles between adjacent light guides 16 are less than 180 degrees. In FIGS. 14-17, the light engines 14 alternate in orientation (i.e., the second light engine 96 faces in an opposite direction from the first and third light engines 92, 100). This allows the modular lighting assembly 12 to be fan folded, which is also referred to as accordion folded. In other embodiments, although not illustrated, all light engines 14 face in the same direction to permit a different folding pattern. Also, the modular lighting assembly 12 may be suspended or mounted in a folded configuration.

Figure 17:
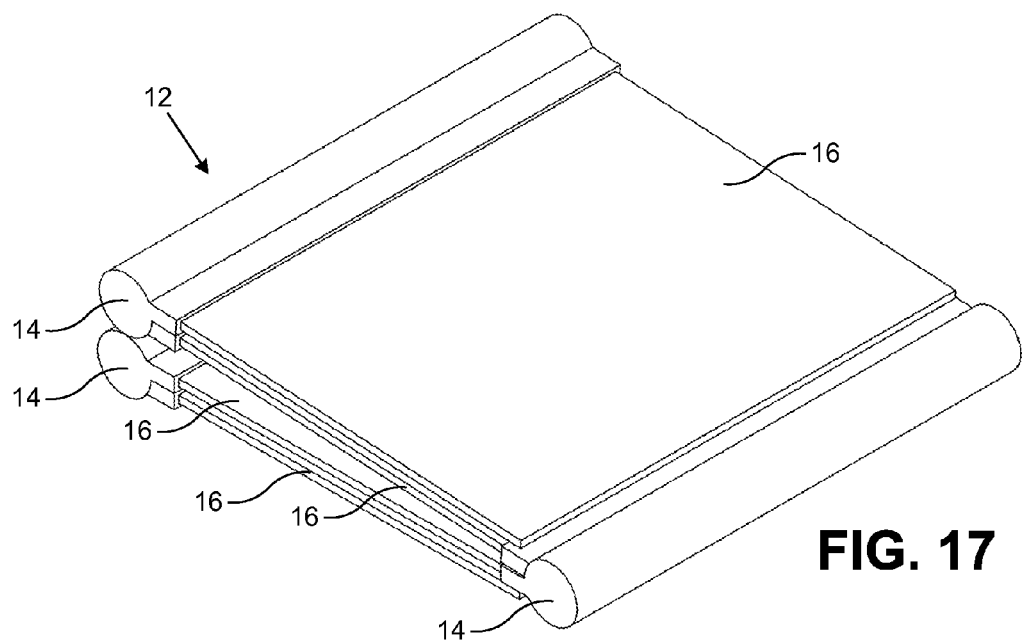
FIG. 17 is a schematic view of the modular lighting assembly of FIG. 14 in another folded configuration.

In FIG. 17, the modular lighting assembly 12 of FIG. 14 is shown in a fully folded configuration, which is obtained by minimizing the hinge angles of the light engines 14. This configuration may be employed for a lighting application, or may be used for storing the modular lighting assembly 12 or for packaging of the modular lighting assembly 12 if sold preassembled.

Figure 18A:
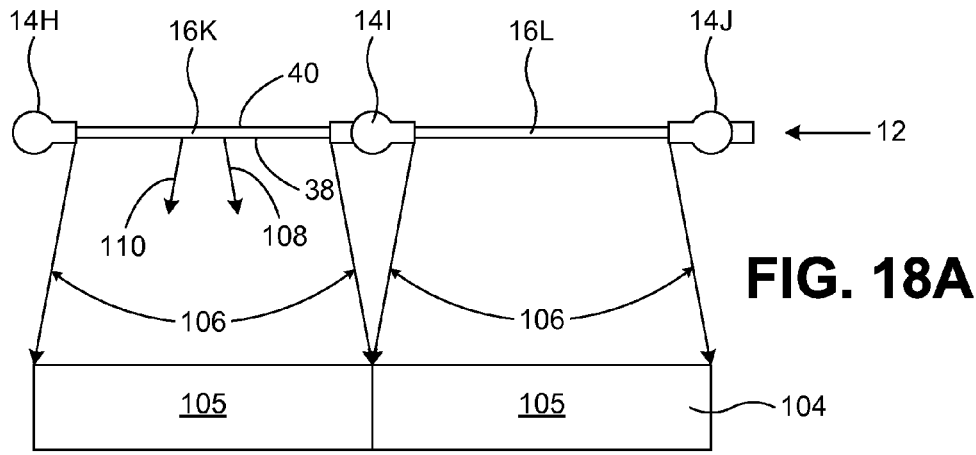
FIGS. 18A-18C are schematic views of exemplary modular lighting assemblies configured to illuminate a surface.
Figure 18B:
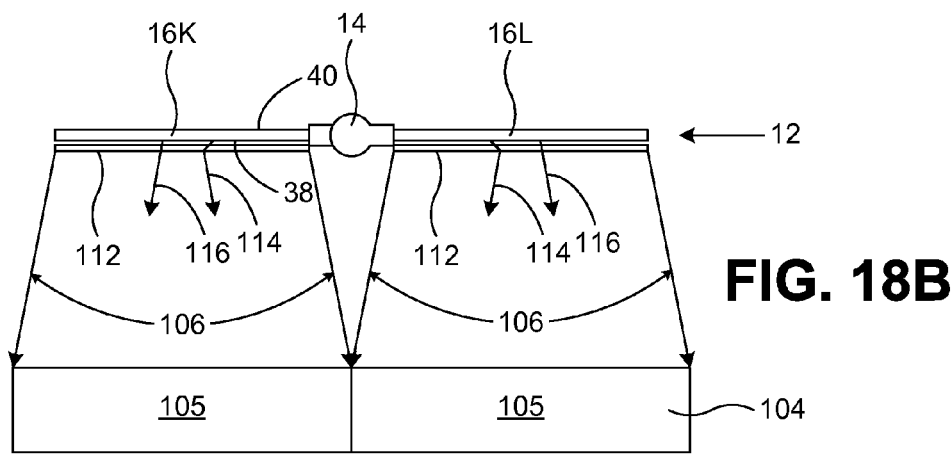
Figure 18C:
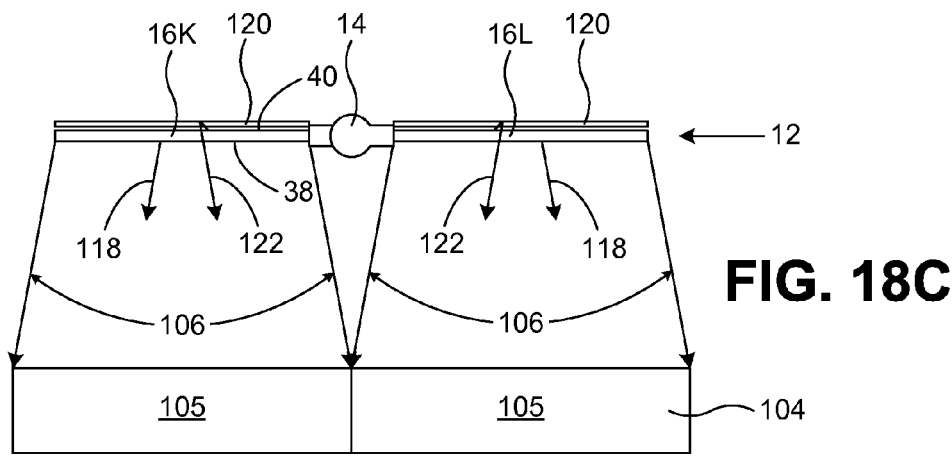

Turning now to FIGS. 18A-18C, embodiments of the modular lighting assembly 12 having at least one light engine 14 and at least two light guides 16 are illustrated in an application in which the modular lighting assembly 12 is used to illuminate a surface 104. The surface 104 may be a table top, a floor, a wall, a ceiling, or other surface. The light extracting elements 42 (FIG. 1) typically extract light from the light guide 16 in a direction away from a light-emitting surface of the light guide 16 (e.g., one or both of the major surfaces 38 or 40) and away from the light sources 32 that generates the light. This configuration typically produces an illumination profile at the surface 104 having an illuminated region 105 associated with each light guide 16 and a darker region between the illuminated regions 105. The embodiments shown in FIGS. 18A-18C, however, each employ different means for outputting at least part of the light output from each light guide 16 with a vector component directed towards the light sources 32 such that the first region 105 illuminated by one light guide is contiguous or overlaps with the second region 105 illuminated by the other light guide.

In the embodiment of FIG. 18A, the modular lighting assembly 12 includes a first light guide 16K and a second light guide 16L. Each light guide 16K, 16L includes two light input edges 30 (FIG. 1) located at opposite ends of the light guide 16K, 16L. Each light input edge 30 is edge lit by light from a corresponding light engine 14 (e.g., light engines 14H and 14I for light guide 16K and light engines 14I and 14J for light guide 16L). The light from each light engine 14 is input to the respective light guide 16K, 16L in a direction away from the light input edge 30 through which light is input, and exits the light guide 16K, 16L in a direction away from the respective light input edge 30 and away from the major surface 38. Arrow 108 represents light from the light engine 14H that is input to the light guide 16K in a first direction and exits through major surface 38 (the surface 38 in the illustrated embodiment being a light emitting surface). Arrow 110 represents light from the light engine 14I that is input to the light guide 16K in a second direction opposite from the first direction and exits through major surface 38. The opposite directions of light input by the light engines 14H and 14I result in a light ray angle distribution 106 that includes light traveling in directions away from the major surface 38 and away from each of the light input edges 30 of the light guide 16K. Relative to the light engine 14I, the light engine 14H performs the function of means for outputting at least part 108 of the light output from the light guide 16K with a vector component directed towards the light engine 14I such that the region 105 illuminated by the light guide 16K is contiguous with the region 105 illuminated by the light guide 16L.

In one embodiment, the control assembly 18 of one of the light engines 14 that supplies light to the light guide 16 is configured to adjust the light output from the light sources 32 to the light guide 16 to maintain a defined illumination within the region 105 that is illuminated by light output from the light guide 16 regardless of an intensity, within a defined range, of light received at the light input edge 30 that is edge lit with the other light engine 14.

In another embodiment, shown in FIG. 18B, the light guides 16K, 16L are edge lit by the light engine 14 and a transmissive light redirecting member 112 is adjacent each light guide 16K, 16L. The transmissive light redirecting member 112 associated with light guide 16K performs the function of means for outputting at least part 114 of the light output from the light guide 16K with a vector component directed towards the light engine 14 such that the region 105 illuminated with the light guide 16K is contiguous with the region 105 illuminated with the light guide 16L. The transmissive light redirecting member 112 is adjacent the light emitting surface (e.g., major surface 38 in the embodiment of FIG. 18B) of the light guide 90. The transmissive light redirecting member 112 is configured to redirect at least some of the light exiting the light emitting surface in a direction having a vector component directed towards the light engine 14 to produce light output with a light ray angle distribution 106. Light that is not redirected is represented by arrow 116. Light that is redirected is represented by arrow 114. In one embodiment, the transmissive light redirecting member 112 is a turning film. In another embodiment, the transmissive light redirecting member 112 includes optical elements, such as at least one of lenticular optical elements, prismatic optical elements, or micro-optical elements.

In another embodiment, shown in FIG. 18C, the light guides 16K, 16L are edge lit by the light engine 14. The light guides 16K, 16L emit light through two opposed light-emitting surfaces, namely the major surface 38 and the major surface 40 in the illustrated embodiment. Light emitted through the major surface 38 facing the illuminated surface 104 is represented by arrow 118 and this light is directed away from the light engine 14 and away from the major surface 38. Light that is emitted through the major surface 40 opposite the major surface 38 is incident on reflective light redirecting member 120 that reflects and redirects the light such that the reflected light 122 has a vector component directed towards the light engine 14. The reflected light passes back through the light guide 102 and exits the major surface 38 travelling in a direction toward the region 105 of surface 104. This light has a direction of travel represented by arrow 122 with a vector component directed towards the light engine 14. The reflective light redirecting member 120 associated with light guide 16K performs the function of means for outputting at least part 122 of the light output from the light guide 16K with a vector component directed towards the light engine 14 such that the region 105 illuminated with the light guide 16K is contiguous with the region 105 illuminated with the light guide 16L. The reflective light redirecting member 120 is adjacent the major surface 40 of the light guide 16K and, in one embodiment, is implemented using a reflective film. In another embodiment, the reflective light redirecting member 120 is provided by reflective elements on the major surface 40 of the light guide 16K. In one embodiment, the reflective light redirecting member 120 may be used in conjunction with the transmissive light redirecting member 112.

Referring to FIGS. 18A-18C, by adjusting the light ray angle distributions 106 of light output by the light guides 16 of the modular lighting assembly 12, the regions 105 may be configured to provide a desired illumination profile on the surface 104. In an example, a continuous illumination pattern is produced on the surface 104 or the illumination patterns overlap at a defined distance from the surface 104. Configuration is accomplished by controlling the angular distribution of the light input to the light guide(s) 16, selection and arrangement of the light extracting elements 42, and, if present, selection and positioning of the transmissive light redirecting member 112 or the reflective light redirecting member 120. The desired illumination profile may be obtained using two light guides and one light engine 14 (e.g., the embodiments illustrated in FIGS. 6-10 and 18B-18C) or more than two light guides and more than one light engine 14 (e.g., the embodiments illustrated in FIGS. 1, 4, 5, 14-17, and 18A).

The modular lighting assemblies can be configured to have angles between the light guides 16 of 180 degrees (e.g., the embodiments illustrated in FIGS. 1, 4, 5, 14, 15 and 18A-18C) or angles between the light guides 16 different from 180 degrees (e.g., the embodiments illustrated in FIGS. 6-10, 16, 17 and 19). Also, the angles between adjacent light guides in the modular lighting assembly 12 may be equal or unequal angles. The light guides in the modular lighting assembly 12 may be curved or planar. Moreover, combinations of the foregoing are possible. In the embodiment of FIG. 19, which represents a folded configuration of the modular lighting assembly 12, the light ray angle distributions 106 from the light guides 16 are configured so that the illumination at the illumination surface 104 is continuous.

Figure 20:
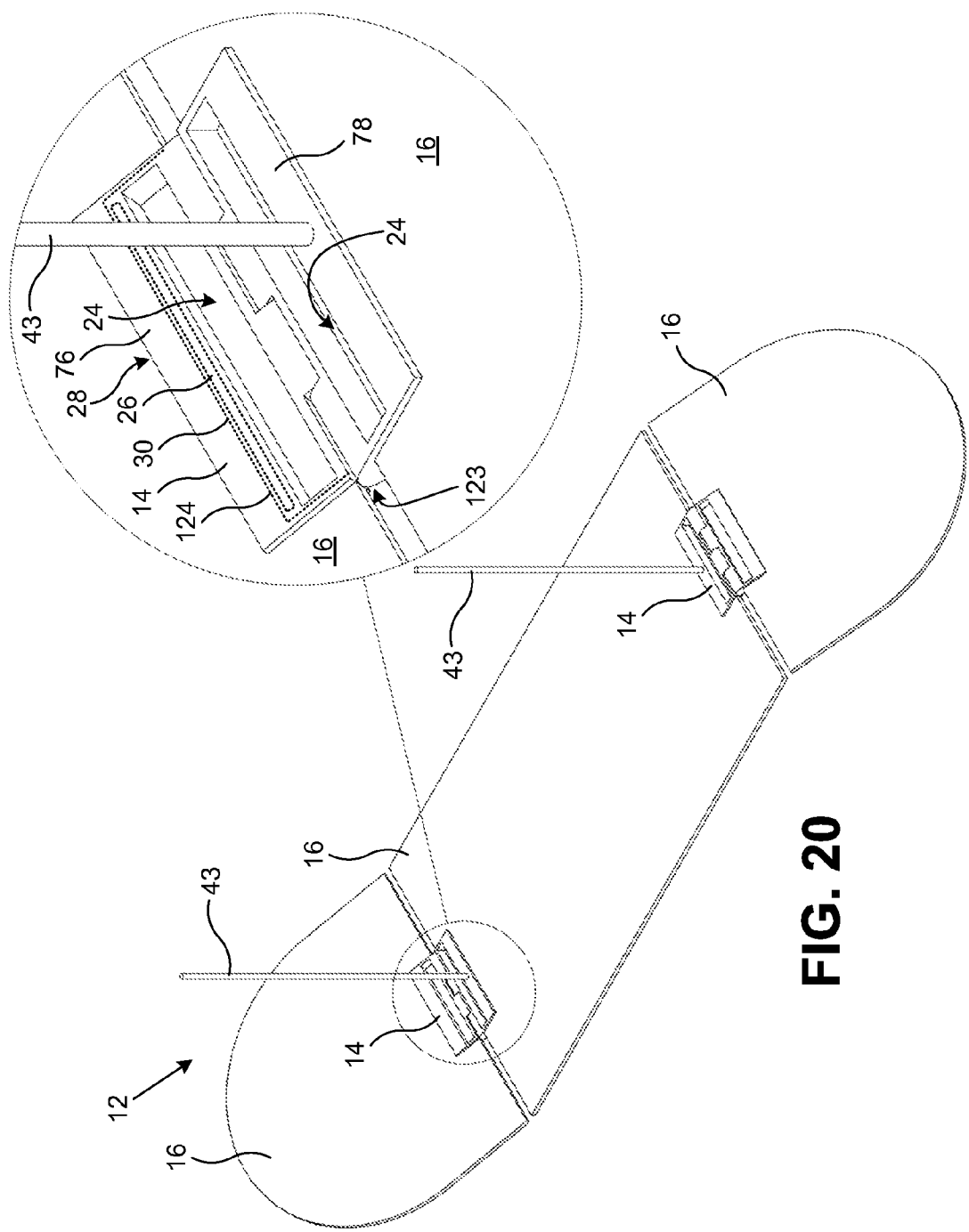
FIG. 20 is a schematic view of another exemplary modular lighting assembly and includes an enlarged view of a hinged light engine.

FIG. 20 illustrates another embodiment of the modular lighting assembly 12 with hinged light engines 14. The hinged light engines 14 of FIG. 20 are similar in construction to the previously described hinged light engines 14. More specifically, the hinged light engines 14 include coupling members 76, 78 that are joined at a hinge 123. In the illustrated embodiment, each light guide 16 has a notch 124 that is configured to accommodate a portion of respective coupling member 76, 78 of the light engine 14 and provides the light input edge 30 of the light guide 16. Each coupling member 76, 78 has a receptacle 28 that accommodates part of the light guide 16 adjacent the notch 124. Input light from the light source segment 26 of the respective coupling member 76, 78 enters the light guide through the light input edge 30. An elongate slot 24 extends through each coupling member 76, 78 between the light source segment 26 and the hinge to provide a path for cooling air flow. The modular lighting assembly 12 of the illustrated embodiment is suspended by a respective retaining member 43 affixed to each coupling member 78.

Figure 21:
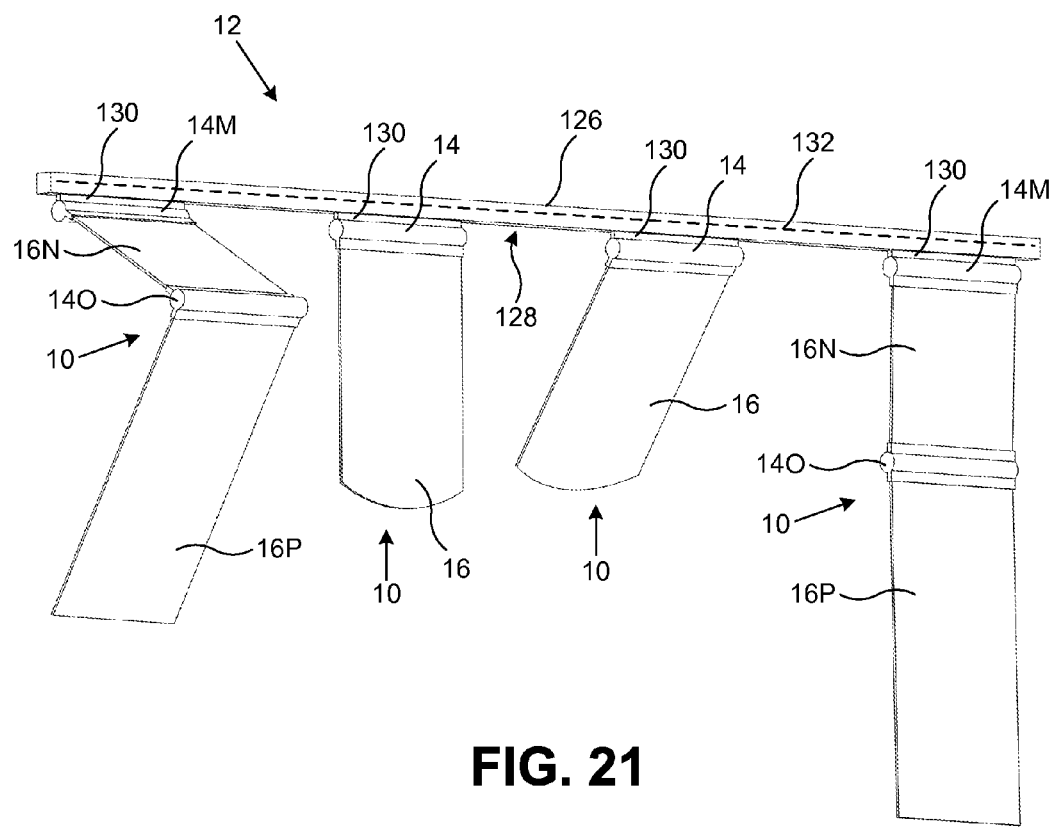
FIG. 21 is a schematic view of another exemplary modular lighting assembly.

Referring now to FIG. 21, another embodiment of the modular lighting assembly 12 is shown. In this embodiment, the modular lighting assembly 12 is arranged as a track lighting system in which a track 126 retains lighting assemblies 10. The track 126 may be mounted to an architectural surface, such as a ceiling or a wall, or may be suspended with retaining members 43 (not shown in FIG. 21). The track 126 includes a slot 128 that receives a connector that attaches each lighting assembly 10 to the track 126. In the illustrated embodiment, the connector is a slot engagement portion 130 of the light engine 14. In one embodiment, the light engines 14 that are retained by the track 126 are slidable along the track 126 to be positioned relative to the track 126 as desired. In one embodiment, the track 126 retains conductors 132 (illustrated schematically by a broken line) that supply electrical power to the light engines via power connectors 61 (FIG. 2) that are on the slot engagement portion 130 of the light engine 14.

Opposite the slot engagement portion 130, the light engines 14 retain and supply light to a light guide 16, as described above. In the illustrated embodiments, the light engines 14 that engage the track 126 are hinged so that the retained light guides 16 are positionable in a range of angles with respect to the track 126. In other embodiments, the light engine 14 can additionally or alternatively be configured to rotate about an axis normal to the longitudinal axis of the light engine 14 (e.g., about an axis normal to the light input edge 30). In this manner, the light guides 16 of the illustrated embodiments are rotatable about an axis extending parallel to the major surfaces thereof. The light engines 14 can be rotatable and hinged to provide a wide variety of possible inclinations for the light guides 16. Any of the above-described light engines 14 may be modified to include this rotation capability. Also, the slot engagement portion 130 may be attached to the light guide 16.

In the embodiment of FIG. 21, some of the lighting assemblies 10 include a single light engine 14 connected to the track 126 and a single light guide 16. Although not illustrated, more than one light guide 16 may be retained and edge lit by the light engine 14 that is connected to the track 126 with an angular separation between the light guides 16. Other lighting assemblies 10 in the illustrated embodiment include a first light engine 14M that is connected to the track 126, a first light guide 16N retained by that light engine 14M, and a second light engine 140 connected to the distal edge of the light guide 16N. The second light engines 140 of the illustrated embodiment are also hinged and retain a second light guide 16P. Power may be delivered to the second light engine 140 from the first light engine 14M using conductors 62 (FIG. 1) that are on or in first light guide 16N. Additional light engines 14 and light guides 16 can be further attached to form various lighting assemblies 10 that are retained by the track 126.

Figure 22:
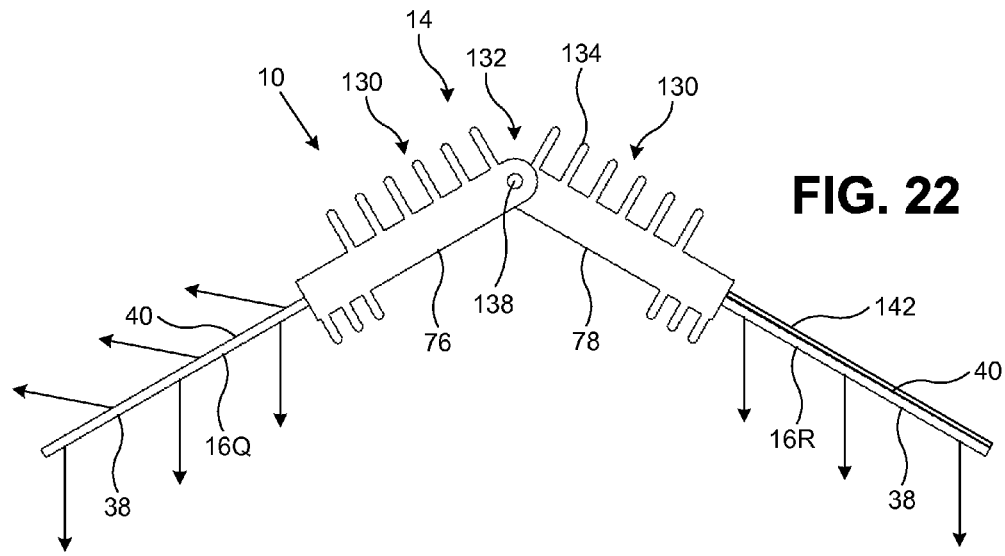
FIGS. 22-25 schematically illustrate additional exemplary modular lighting assemblies.
Figure 23:
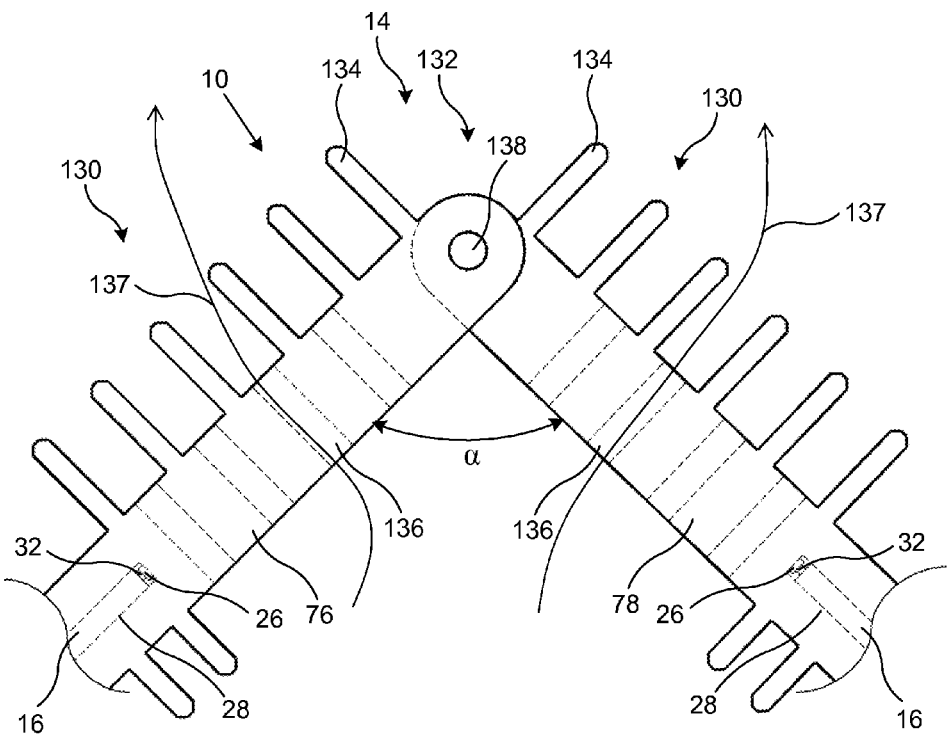
Figure 24:
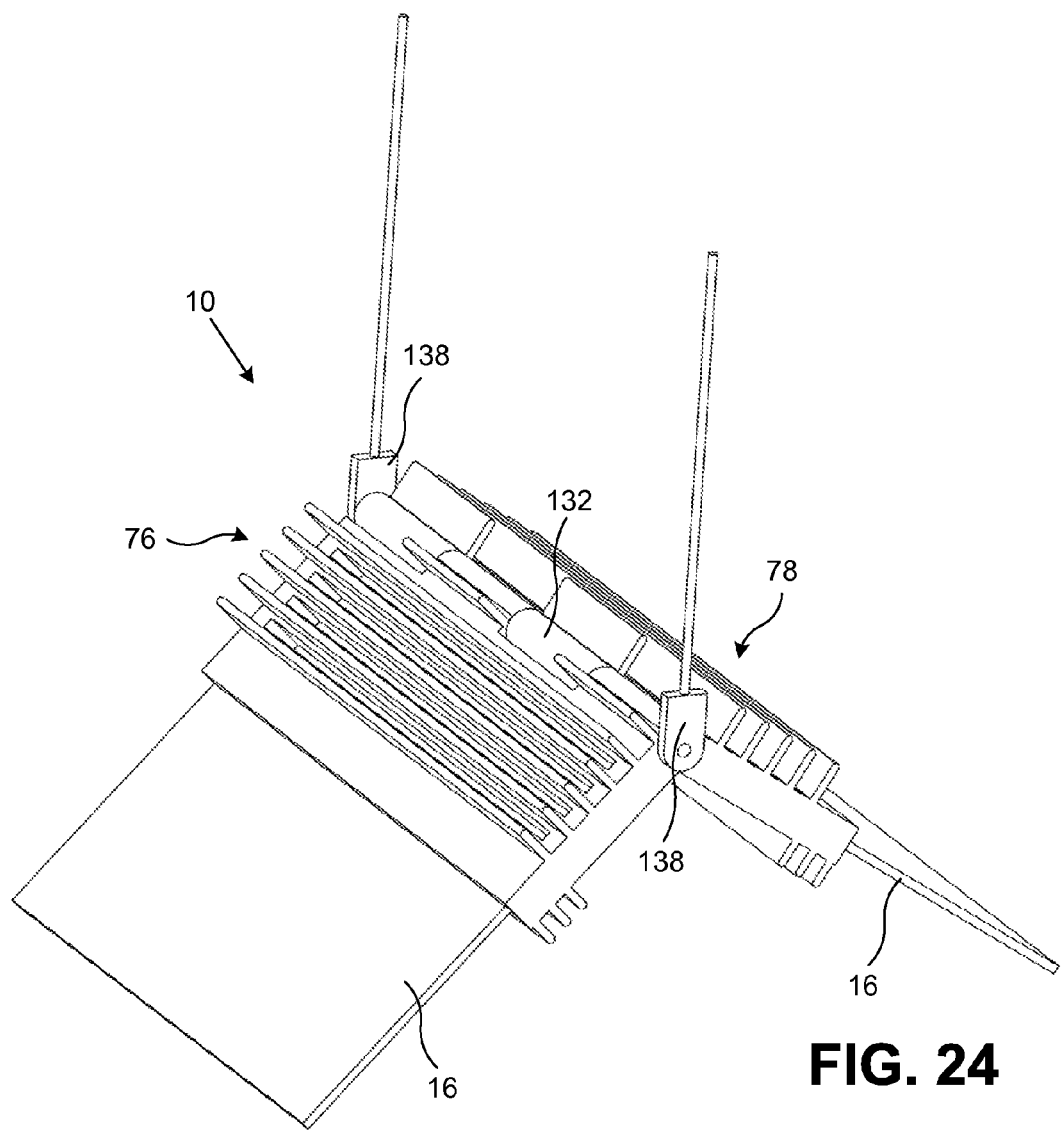

FIGS. 22-24 show an example of another embodiment of the lighting assembly 10. This embodiment is based on the embodiment described above with reference to FIGS. 6-10, but uses a hinged light engine 14 with a greater heat dissipation capability. Specifically, each coupling member 76, 78 includes a heat sink 130. The light source segment 26 is thermally coupled to the heat sink 130. In the example shown, each heat sink 130 includes fins 134 and internal air passages 136 through which air may travel (represented by arrows 137) to promote heat dissipation by the heat sink. The greater heat dissipating capacity provided by the heat sink 130 allows the light source segment 26 to include more light sources 32, supply higher current to the light sources 32 and/or use higher-power light sources 32.

In some embodiments, the hinge 132 includes a static portion 138 about which coupling members 76, 78 contra-rotate as the angle α between them is adjusted. The static portion 138 is used to suspend or mount the lighting assembly 10, as shown in FIG. 24, and power connections to the lighting assembly can also be made at the static portion. The coupling member 76, 78, the heat sink 130, and a portion of the hinge 132 may be a single component or multiple components, and may additionally be made of a highly thermally conductive material, such as aluminum or copper.

In the example shown, the light guides 16 are planar. In other examples, one or both light guides 16 are curved (e.g., in a manner similar to that shown in FIGS. 6-10).

FIG. 22 shows two different exemplary configurations of the light guides 16. The light guides 16Q, 16R include light extracting elements (not shown) that extract light from the light guides 16Q, 16R through the major surfaces 38 and 40. The light guide 16R additionally includes a reflector 142 adjacent the major surface 40 to reflect light extracted from the light guide 16R through the major surface 40 back into the light guide such that the light passes through the light guide 16R and exits through the major surface 38. The light guide 16Q is configured for directly illuminating a surface below the lighting assembly 10 and additionally for providing a wash of light on another surface above the lighting assembly. In one embodiment this is accomplished by using two configurations of light extracting elements. The first configuration of light extracting elements extracts light through the major surface 40 of the light guide 16Q with a light ray angle distribution in which low light ray angles (relative to the major surface 40) predominate. The second configurations of light extracting elements extracts light from the major surface 38 of the light guide 16Q with a light ray angle distribution in which medium light ray angles (relative to the major surface 38) predominate. Typically, both of the light guides are of the same type.

In other embodiments, the light engine 14 is not hinged and the coupling members 76, 78 are set at a fixed angle relative to one another, suitable for a given application.

Figure 25:
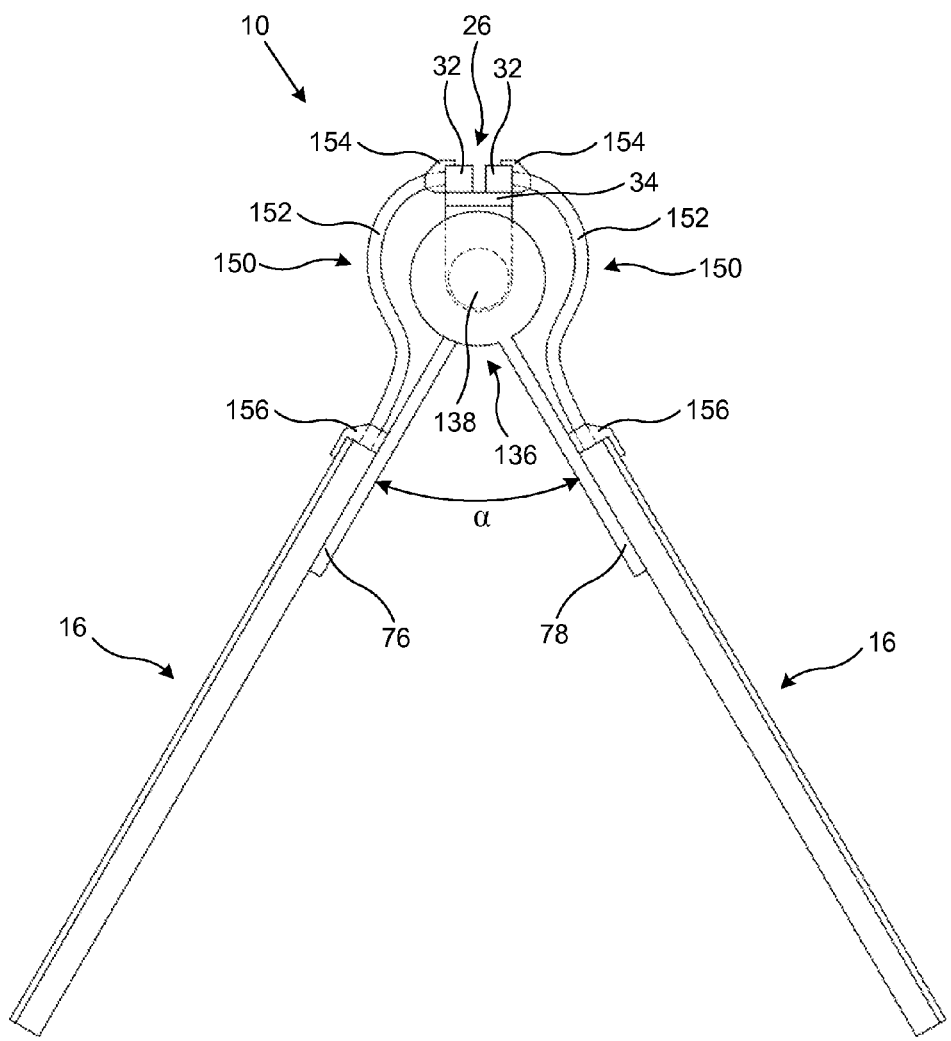

FIG. 25 shows an example of another embodiment of the lighting assembly 10 having a common light source segment 26 for providing light to both light guides 16. The light source segment 26 is coupled to the static portion 138 of the hinge 136. The light source segment 26 includes a printed circuit board (PCB) 34 on which back-to-back sets of light sources 32 are mounted. Coupling members 76, 78 couple the light guides 16 to the hinge 136.

Flexible light couplings 150 extend between each light guide 16 and a respective set of the light sources 32. In the example shown, each flexible light coupling 150 includes a flexible light conductor 152 with a light coupler 154, 156 at each end. Light coupler 154 couples to a set of light sources 32 and light coupler 156 couples to the light input edge 30 of the respective light guide 16. The flexible light conductor 152 flexes as the angle α is adjusted. The light coupler 154 maintains the angle of incidence of light on the flexible light conductor 152 as the flexible light conductor flexes. The light coupler 156 maintains the angle of incidence of light on the light input edge 30 of the light guide 16 as the flexible light conductor flexes. In an example, the flexible light conductor is an optical fiber or an array of optical fibers.

In this disclosure, the phrase "one of" followed by a list is intended to mean the elements of the list in the alterative. For example, "one of A, B and C" means A or B or C. The phrase "at least one of" followed by a list is intended to mean one or more of the elements of the list in the alterative. For example, "at least one of A, B and C" means A or B or C or (A and B) or (A and C) or (B and C) or (A and B and C).

What is claimed is:

1. A track-based lighting assembly, comprising:
   a track; and
   a light engine mechanically and electrically coupled to the track, the light engine comprising:
      a light source; and
      a coupling member retaining the light source and configured to retain a light guide to the light engine such that light from the light source edge lights the light guide, wherein the coupling member is rotatable to adjust an angular position between the light guide and the track.

2. The track-based lighting assembly of claim 1, wherein the light engine further comprises a static portion to which the coupling member is mechanically coupled and relative to which the coupling member rotates.

3. The track-based lighting assembly of claim 1, wherein the light engine further comprises a connector that mechanically and electrically couples the light engine to the track.

4. The track-based lighting assembly of claim 1, wherein the coupling member is rotatable about a longitudinal axis of the track.

5. The track-based lighting assembly of claim 1, wherein the coupling member is rotatable about an axis normal to a longitudinal axis of the track.

6. The track-based lighting assembly of claim 1, further comprising the light guide retained by the coupling member, the light guide comprising:
   opposed major surfaces;
   a light input edge extending between the opposed major surfaces, the opposed major surfaces configured to propagate light input to the light guide through the light input edge therebetween by total internal reflection; and
   micro-optical elements at at least one of the opposed major surfaces.

7. The track-based lighting assembly of claim 1, wherein the coupling member comprises a heat sink.

8. The track-based lighting assembly of claim 1, wherein the track retains plural ones of the light engine along a length of the track.

9. The track-based lighting assembly of claim 1, wherein a position of the light engine is adjustable along a length of the track.

10. The track-based lighting assembly of claim 1, wherein the track is suspended from an architectural surface.

11. The track-based lighting assembly of claim 1, wherein the track is mounted to an architectural surface.

12. The track-based lighting assembly of claim 1, further comprising an ambient light sensor and the lighting assembly adjusts light output by the light source in accordance with a detected level of ambient light to control an overall light level in a space illuminated by the lighting assembly.

13. The track-based lighting assembly of claim 1, wherein:
   the light source is a first light source;
   the coupling member is a first coupling member; and
   the light engine further comprises:
      a second light source; and
      a second coupling member retaining the second light source and configured to retain another light guide to the light engine such that light from the second light source edge lights the another light guide, wherein the second coupling member is rotatable to adjust an angular position between the another light guide and the track, and the first coupling member and the second coupling member are rotatable relative to each other to adjust an angular position therebetween.

14. The track-based lighting assembly of claim 13, wherein the first coupling member and the second coupling member are rotatable relative to each other about respective axes that are parallel to a longitudinal axis of the track.

15. A light engine, comprising:
- a first light source;
- a first coupling member retaining the first light source and configured to retain a first light guide to the light engine such that light from the first light source edge lights the first light guide;
- a second light source;
- a second coupling member retaining the second light source and configured to retain a second light guide to the light engine such that light from the second light source edge lights the second light guide; and
- the first coupling member and the second coupling member are rotatable relative to each other to adjust an angular position therebetween.

16. The light engine of claim 15, wherein the first coupling member is hingedly attached to the second coupling member.

17. The light engine of claim 15, wherein the light engine further comprises a static portion to which each of the first and second coupling members are mechanically coupled and relative to which each of the first and second coupling members rotate.

18. The light engine of claim 17, wherein the first and second coupling members contra-rotate relative to the static portion.

19. The light engine of claim 15, further comprising a retaining member coupled to the light engine, the lighting assembly suspended by the retaining member.

20. The light engine of claim 15, further comprising a connector configured to electrically and mechanically couple the light engine to a track.

* * * * *